(12) United States Patent
Moriyama

(10) Patent No.: US 7,302,177 B2
(45) Date of Patent: Nov. 27, 2007

(54) OPTICAL TRANSMISSION SYSTEM INCLUDING A PLURALITY OF OPTICAL TRANSMISSION DEVICES

(75) Inventor: Junichi Moriyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 554 days.

(21) Appl. No.: 10/988,645

(22) Filed: Nov. 16, 2004

(65) Prior Publication Data

US 2006/0024054 A1    Feb. 2, 2006

(30) Foreign Application Priority Data

Jul. 29, 2004   (JP) ............................. 2004-221935

(51) Int. Cl.
*H04B 10/08* (2006.01)

(52) U.S. Cl. ............................ 398/19; 398/17; 398/18; 398/20; 398/10; 398/12; 370/216; 370/217; 370/221; 370/222; 370/225

(58) Field of Classification Search .................... 398/1, 398/3, 5, 10–12, 17–20, 25, 37, 177; 370/212–228
See application file for complete search history.

(56) References Cited

U.S. PATENT DOCUMENTS

| | | | |
|---|---|---|---|
| 5,446,725 A | 8/1995 | Ishiwatari | |
| 5,570,344 A | 10/1996 | Fujii | |
| 5,978,354 A * | 11/1999 | Taketomi et al. | 370/226 |
| 6,879,558 B1 * | 4/2005 | Honda et al. | 370/222 |
| 7,046,619 B2 * | 5/2006 | Alagar et al. | 370/216 |
| 7,113,698 B1 * | 9/2006 | Ryhorchuk et al. | 398/10 |
| 2002/0181037 A1 * | 12/2002 | Lauder et al. | 359/110 |
| 2002/0181503 A1 * | 12/2002 | Montgomery, Jr. | 370/468 |

FOREIGN PATENT DOCUMENTS

JP         2003-304274        10/2003

* cited by examiner

*Primary Examiner*—Kenneth Vanderpuye
*Assistant Examiner*—Li Liu
(74) *Attorney, Agent, or Firm*—Staas & Halsey LLP

(57) ABSTRACT

Two multiplexing/demultiplexing sections of working and protection sides are prepared for each of a plurality of optical transmission devices which constitute a system, and the optical transmission devices are synchronized with each other to execute switching between the working and protection sides so that one of the working and protection sides can be selected for the entire system. Each expansion device collects optical line trouble information for each of the working and protection sides, and transmits to a main device. The main device integrates the information with trouble information transmitted from expansion devices per expansion device. The main device converts the integrated trouble information into point information, totals for each of the working and protection sides, compares, and decides which of the working and protection sides is to be selected.

5 Claims, 21 Drawing Sheets

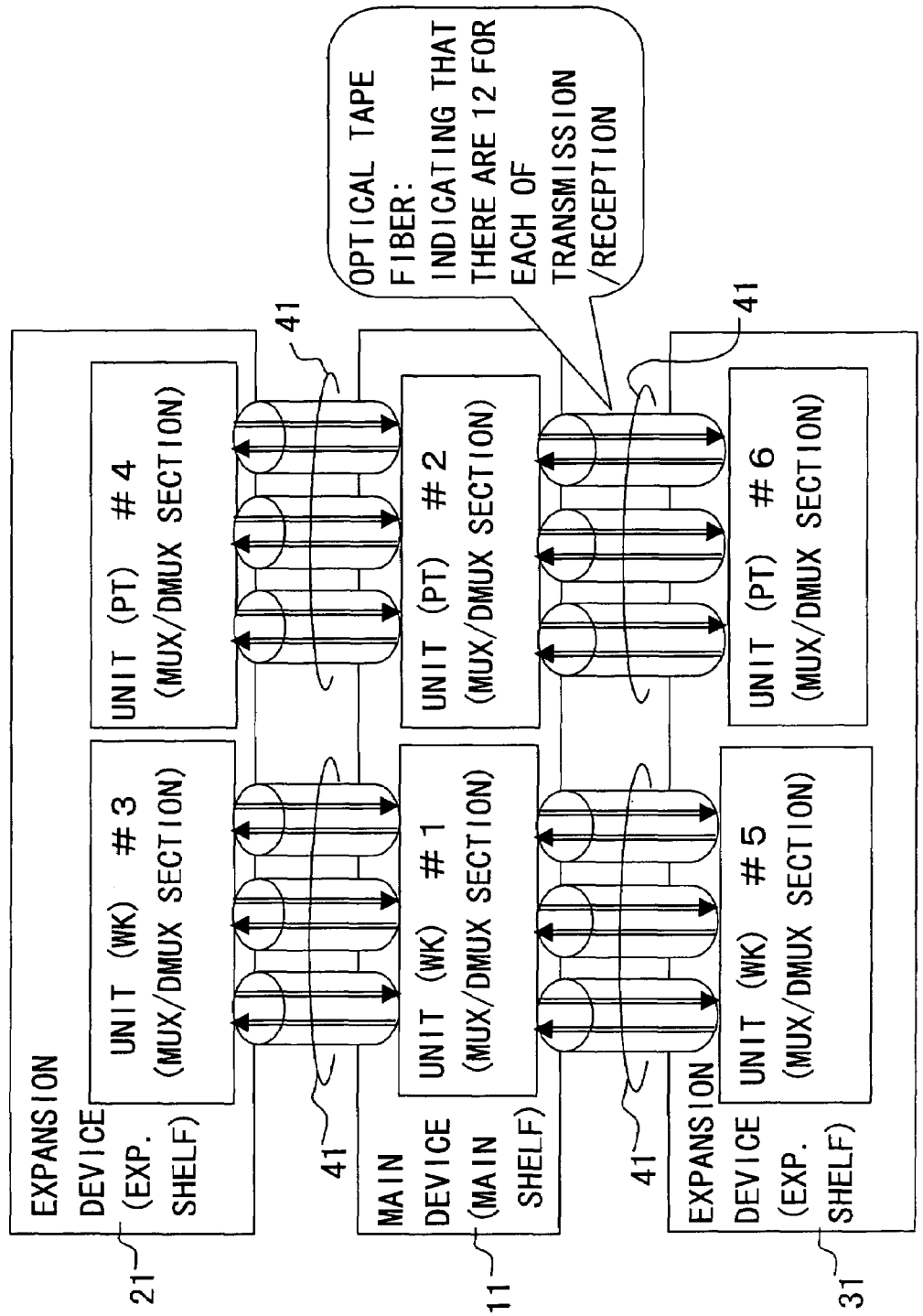

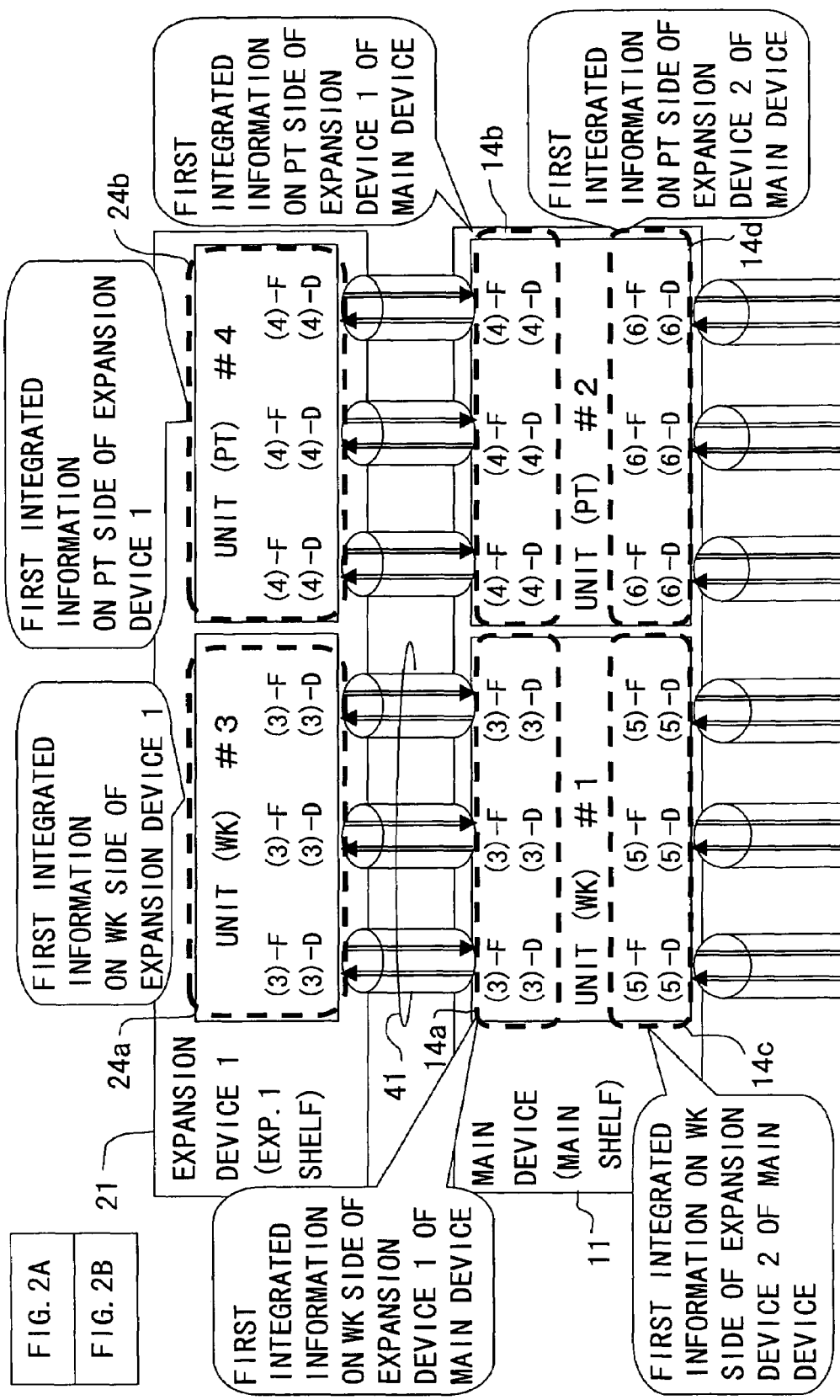

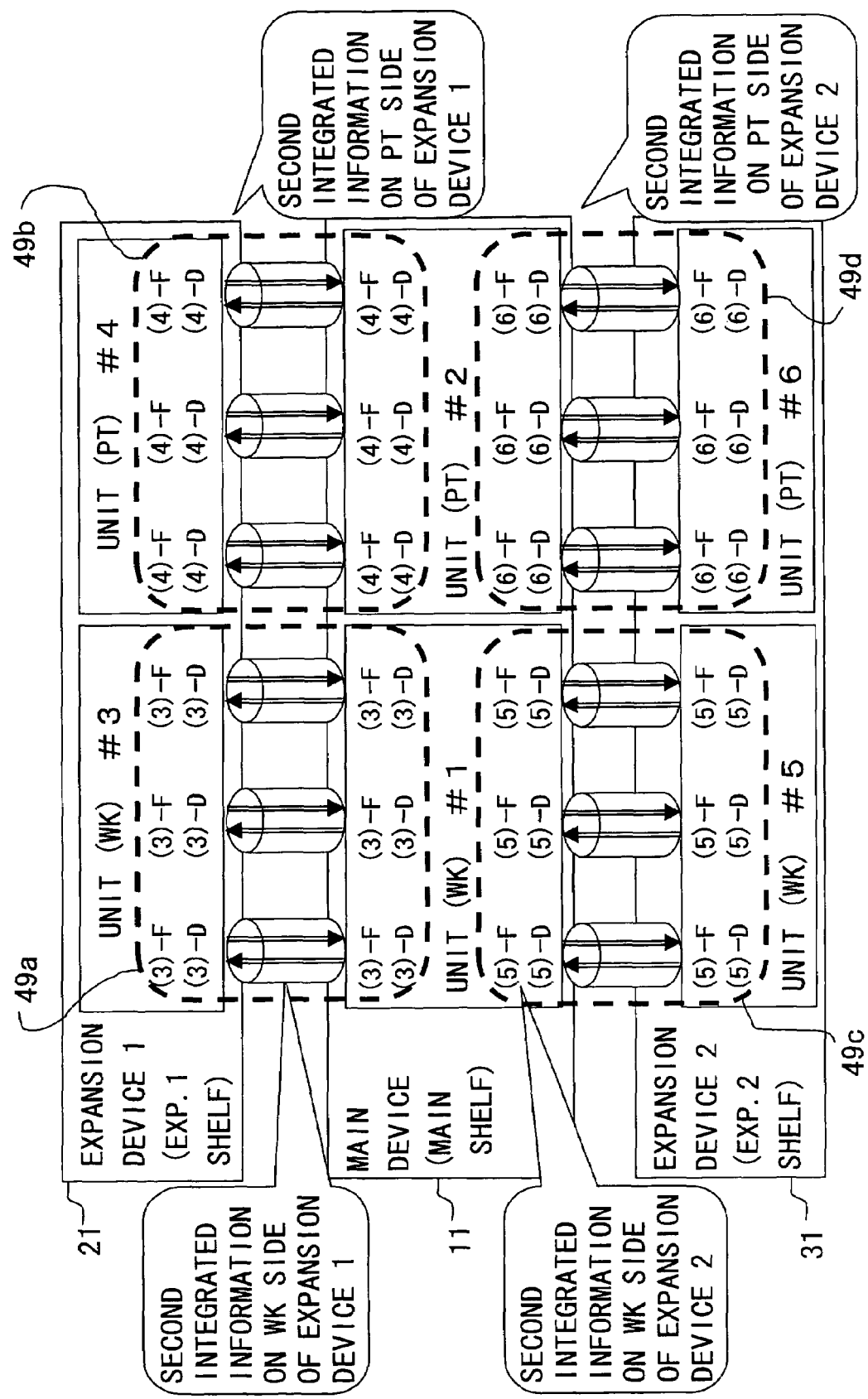

FIG. 4

| TROUBLE INFORMATION TYPE | PRIORITY |
|---|---|
| PROTECT SIDE UNIT TROUBLE, UNMOUNTED | HIGH |
| WORK SIDE UNIT TROUBLE, UNMOUNTED | |
| SF-N (PROTECT) | |
| SF-N (WORK) | |
| SF-N-1 (WORK/PROTECT) | |
| . | |
| . | |
| SF-2 (WORK/PROTECT) | |
| SF-1 (WORK/PROTECT) | |
| SD-N (WORK/PROTECT) | |
| SD-N-1 (WORK/PROTECT) | |
| . | |
| . | |
| SD-2 (WORK/PROTECT) | |
| SD-1 (WORK/PROTECT) | |
| MANUAL SWITCHING REQUEST | |
| NR | LOW |

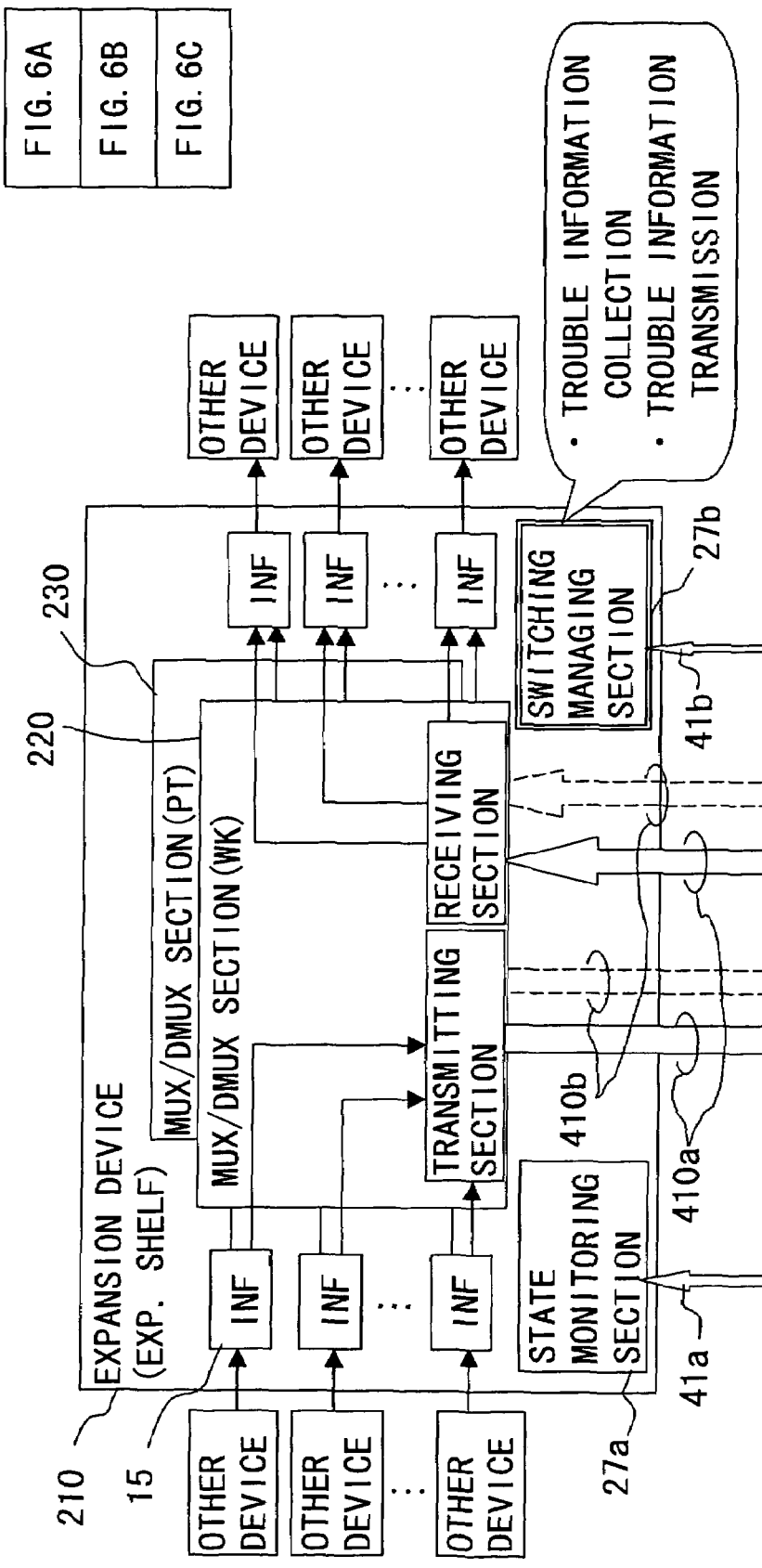

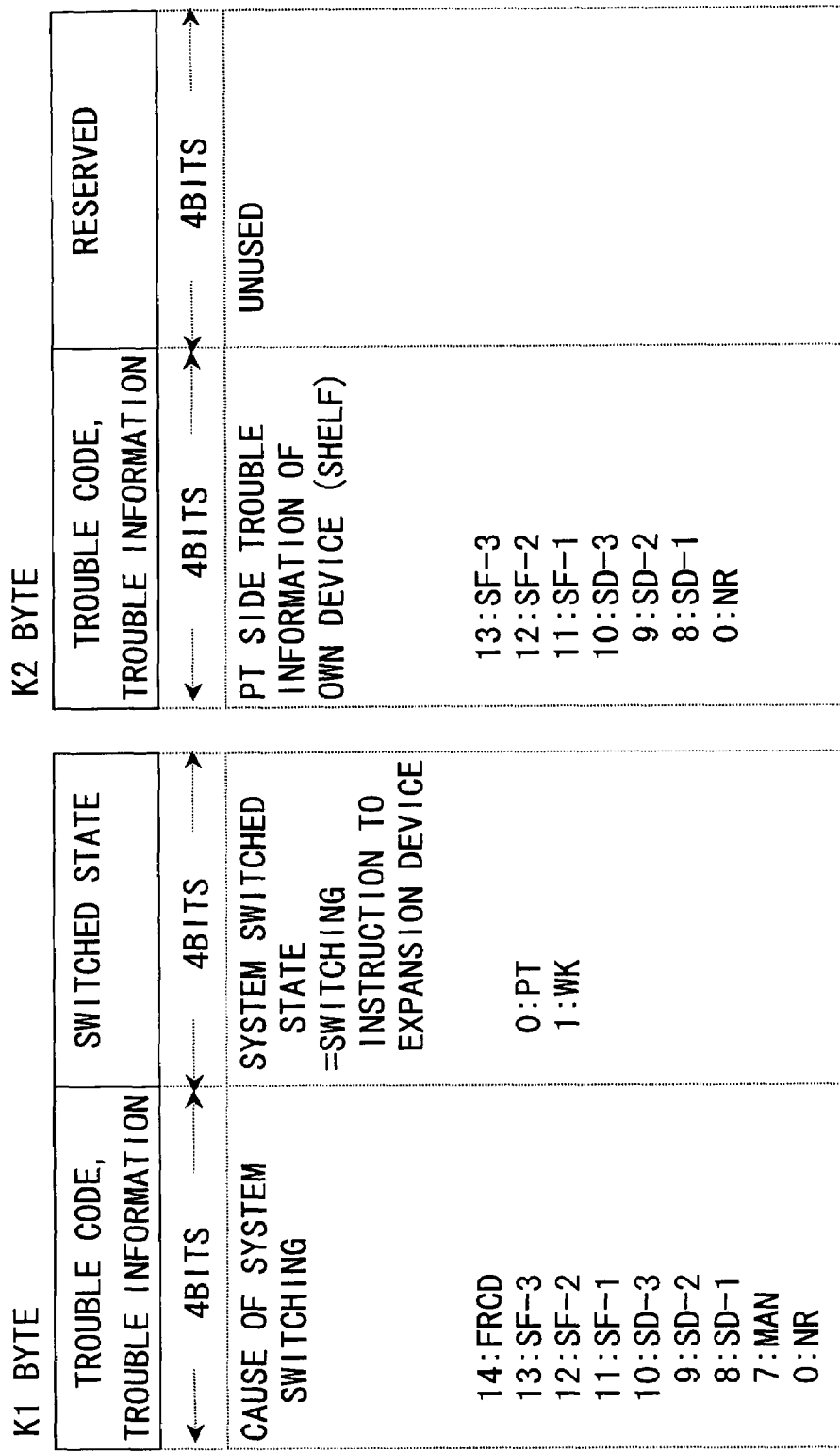

FIG. 8

| TROUBLE TYPE | TROUBLE POINT |
|---|---|
| PROTECT SIDE UNIT TROUBLE, UNMOUNTED | 150 |
| WORK SIDE UNIT TROUBLE, UNMOUNTED | 130 |
| SF-3 (PROTECT) | 70 |
| SF-3 (WORK) | 45 |
| SF-2 (WORK/PROTECT) | 23 |
| SF-1 (WORK/PROTECT) | 10 |
| SD-3 (WORK/PROTECT) | 3 |
| SD-2 (WORK/PROTECT) | 2 |
| SD-1 (WORK/PROTECT) | 1 |
| NR | 0 |

FIG. 11A
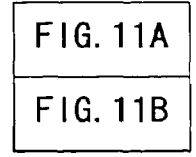
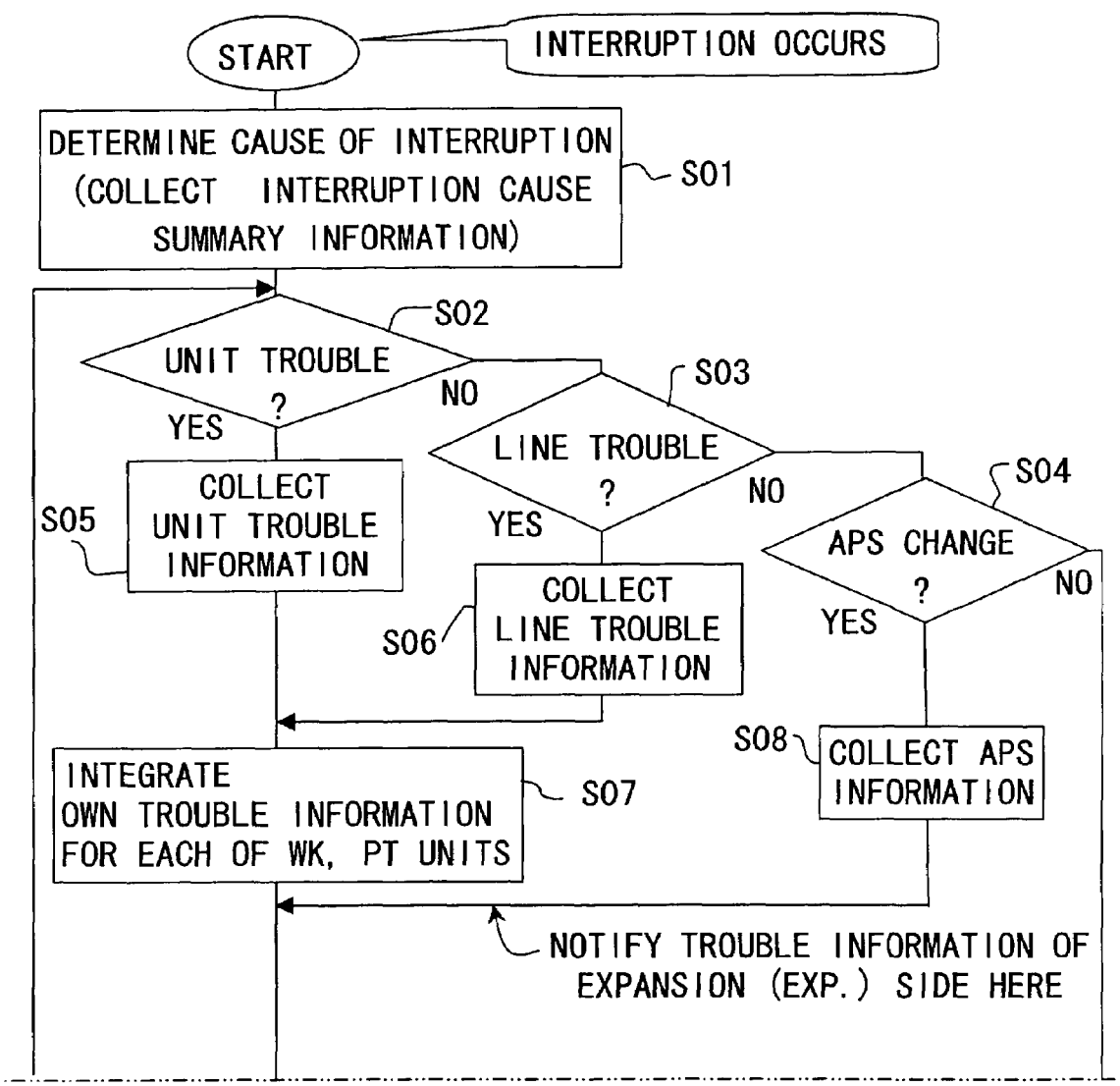

OPTICAL TRANSMISSION SYSTEM INCLUDING A PLURALITY OF OPTICAL TRANSMISSION DEVICES

BACKGROUND OF THE INVENTION

1. Field of the Invention

The present invention relates to an optical transmission system including a plurality of optical transmission devices.

2. Description of the Related Art

Recently, regarding an optical transmission device, to achieve a high capacity of optical transmission, an optical transmission system operated by combining some basic optical transmission devices has been constructed. In such an optical transmission system constructed by combining a plurality of optical transmission devices (also called Shelves), when each optical transmission device is provided with information including a log-in ID for optical transmission device management, and when the information is managed for each optical transmission device, a system operation becomes complex. Accordingly, there is a strong demand for a system which enables an easier operation by managing an optical transmission system including a plurality of optical transmission devices as a single device, and reducing network resources.

FIG. 14 is a diagram showing a functional constitution in an optical transmission system (referred to as "conventional device") which includes one basic optical transmission device. As shown in FIG. 14, the conventional device is arranged on a transmission line of optical signals. The conventional device includes a plurality of optical interface units (INF) 15 for receiving/transmitting optical signals from/to the other devices, and multiplexer/demultiplexer sections (referred to as MUX/DMUX sections, hereinafter) 12, 13 for multiplexing/demultiplexing the signals received by each of the interface units 15, and outputting to the interface units 15 corresponding to addresses of the signals. Each of the MUX/DMUX sections 12, 13 includes a signal connection converting section (cross connection) 12a for connecting an input signal to an outgoing path corresponding to its address.

Thus, two communication units (Units) which include the MUX/DMUX sections are disposed in the optical transmission device. One of the two MUX/DMUX sections 12, 13 is used as a working side (working line (WK)) device, and the other is used as a protection side (protection line (PT)) device used when the working side fails. Accordingly, the signal transmission line is made redundant. A state of the optical transmission device is monitored by a state monitoring section, and switching between the WK side and the PT side is carried out by a switching managing section.

There is a limit to the number of slots for connection to one basic optical transmission device, i.e., the number of optical interface units 15 mounted on one basic transmission device. Thus, to realize large-capacity transmission, an optical transmission system in which a plurality of basic optical transmission devices are interconnected must be constructed. To realize such a configuration, cooperation is necessary among the plurality of interconnected optical transmission devices in terms of signal connection. Accordingly, cooperation may conceivably be established among the optical transmission devices in terms of the signal connection by using parts of the optical interface units 15 to execute transfer of signals among the optical transmission devices.

However, when a capacity of the interface unit is used to connect each optical transmission device, a transmission permission amount of the device is consequently reduced by a connection amount with the other transmission device. Besides, presence of the signal connection converting section in each optical transmission device necessitates complex signal connection management.

Thus, in the configuration in which the plurality of optical transmission devices are connected, a functional constitution as shown in FIG. 15 is conceivable. FIG. 15 shows a functional constitution in the configuration in which the plurality of optical transmission devices are interconnected. According to the constitution, classification is employed in which one of the plurality of optical transmission devices becomes a main device (MAIN Shelf) 11, while the other optical transmission devices become expansion devices (Expansion (EXP) Shelves) 21. The signal connection converting section 12a is disposed in WK and PT MUX/DMUX sections 12, 13 alone mounted on the main device.

Accordingly, it is possible to concentrate management regarding complex signal connection conversion on the main device. Inter-optical transmission device connecting functions are provided to the WK and PT MUX/DMUX sections 12, 13 disposed in each optical transmission device, whereby signal connection conversion is enabled among the optical transmission devices, and information can be transferred between state monitoring sections 17a, 27a and between switching managing sections 171b, 271b of each optical transmission device.

According to the constitution, switching states (selecting states) of the WK/PT sides must be the same between the optical transmission devices. That is, when the WK MUX/DMUX section 12 is made active in the main device, the WK MUX/DMUX section 12 is similarly made active in the expansion device. Conversely, when the PT MUX/DMUX section 13 is used in the main device, the PT MUX/DMUX section 13 is similarly used in the expansion device. Otherwise, a signal phase difference is generated between the main device and the expansion device to cut off signals. Therefore, a switching operation of the communication unit which includes the MUX/DMUX sections 12, 13 must be executed in synchronization between the optical transmission devices.

Normally, the switching of the communication unit which includes the MUX/DMUX sections is controlled based on troubles of the unit such as a failure of the communication unit itself, unit omission, or a power supply trouble. However, in the functional constitution shown in FIG. 15, since the MUX/DMUX sections 12, 13 handle an optical line to transfer signals among the optical transmission devices, a trouble of the optical line must also be a cause of unit switching.

The signal to interconnect the optical transmission devices needs to have a signal capacity of about 100 gigabytes to realize a large capacity. Thus, many optical fibers are used to make connection. Accordingly, to set the trouble of the optical line as a cause of unit switching, line trouble states of the lines are collected by the optical transmission devices, and trouble information are combined for the entire system. A switching state that can save as many lines as possible must be determined from the huge amount of trouble information, and unit switching must be executed within a short time.

However, to manage a huge amount of trouble patterns and to decide a switching state which matches each trouble occurrence state, complex determination must be made, and much time must be expended for determination as to execution of switching. Accordingly, a case may occur in which standard switching regulations of 50 milliseconds by a single trouble and 100 milliseconds or less by a plurality of troubles cannot be met. A huge amount of test patterns must be implemented to test all the cases for the huge amount of trouble patterns, and much time must be expended to guarantee qualities. In addition, presence of the huge amount of trouble patterns makes difficult determination as to whether test patterns corresponding to all the trouble patterns are included or not, and establishment of a testing range. Therefore, it is difficult to secure a quality of the optical transmission system.

Note that conventional art documents concerning the present invention are as follows. The conventional art documents are "Japanese Patent Application No. 07-240732 A", "Japanese Patent Application No. 2003-304274 A", "Japanese Patent Application No. 03432958 B", and "Japanese Patent Application No. 02570016 B".

SUMMARY OF THE INVENTION

The present invention has an object to realize proper switching within a short time by simplifying switching determination between working and protection sides.

The present invention employs the following constitution to solve the aforementioned problems. That is, the present invention provides an optical transmission system which haves a plurality of optical transmission devices including one main device and a plurality of expansion devices. The optical transmission device comprises a plurality of interface units which control signal transmission/reception, and each multiplexing/demultiplexing section of each of working and protection sides which multiplexes/demultiplexes a signal transmitted/received by each interface unit. The multiplexing/demultiplexing section of the working side of each expansion device is connected through a plurality of optical lines to the multiplexing/demultiplexing section of the working side of the main device. The multiplexing/demultiplexing section of the protection side of each expansion device is connected through a plurality of optical lines to the multiplexing/demultiplexing section of the protection side of the main device. The multiplexing/demultiplexing section of each of the working and protection sides of the main device comprises a switching section which switches an output destination of a signal input to each of the main device and the expansion devices according to an address of the signal. Each of the plurality of expansion devices comprises a expansion device side trouble information collecting section which collects trouble information, indicating a trouble state of one or more optical lines among the plurality of optical lines for receiving a signal from the main device, for each of the working and protection sides, a transmitting section which transmits the collected trouble information of the working and protection sides to the main device, and a expansion device side working/protection switching control section which controls switching between the working and protection sides according to a switching instruction between the working and protection sides received from the main device. The main device comprises a main device side trouble information collecting section which collects trouble information indicating a trouble state of, among the plurality of optical lines for connecting the main device and the expansion devices, the optical line for receiving a signal from each of the expansion devices for each of the working and protection sides and each expansion device, a receiving section which receives the trouble information of the working and protection sides collected by the expansion device side trouble information collecting section from the expansion device, an integrating section which creates integrated trouble information integrating the trouble information collected by the main device side trouble information collecting section and the trouble information collected by the expansion device side trouble information collecting section for each of the working and protection sides and each expansion device, a storing section which stores point information corresponding to the integrated trouble information, a converting section which converts the integrated trouble information into the point information stored in the storing section, a totaling section which totals converted point information regarding each of the working and protection sides, a deciding section which decides which of the working and protection sides is selected by comparing the totaled point information with each other, and a main device side working/protection switching control section which controls switching between the working and protection sides for the main device according to a deciding result of the deciding section, and notifies each expansion device of a switching instruction similar to that for the main device.

According to the present invention, the two multiplexing/demultiplexing sections of the working and protection sides are prepared for each of the plurality of optical transmission devices which constitute the system, and the optical transmission devices are synchronized with each other to execute switching between the working and protection sides so that one of the working and protection sides can be selected for the entire system.

To decide such switching between the working and protection sides, each expansion device collects trouble information of, among the plurality of optical lines for connecting the main device, one or more optical lines for receiving the signal from the main device for each of the working and protection sides, and transmits to the main device.

The main device collects trouble information of, among the plurality of optical lines for connecting the main device and the expansion device, the optical line for transmitting the signal from each expansion device to the main device for each of the working and protection sides, and integrates the trouble information and the trouble information transmitted from the expansion devices on the basis of per expansion device. Then, the main device converts each of the integrated trouble information into point information, and totals such point information for each of the working and protection sides. Subsequently, the main device compares the totaled point information to decide which of the working and protection sides is to be selected, and executes switching between the working and protection sides of the main device and the expansion devices according to the result.

Thus, according to the present invention, switching determination is facilitated by integrating the point information indicating a state of executing switching between working and protection sides. As a result, since determining processing necessary for switching judgment is greatly reduced, it is possible to shorten a time necessary for switching determination, and to shorten a time necessary for switching processing.

According to the present invention, the point information is a numerical value allocated according to a degree of a trouble indicated by the integrated trouble information so that the deciding section selects side of a good degree of a trouble between the working and protection sides.

According to the present invention, to make switching determination between the working and protection sides, the main device converts the integrated trouble information into the point information, i.e., the numerical value allocated according to a degree of trouble, and compares such numerical values to lastly decide switching.

Thus, according to the present invention, in the switching determination between the working and protection sides, it is possible to select a side which can pass a signal even a little only by comparing the numerical values (point information).

In addition, according to the present invention, the main device side working/protection switching control section notifies each expansion device of the switching instruction by using an overhead portion of an optical communication frame transmitted through at least one of the plurality of optical lines for connecting the multiplexing/demultiplexing section of the protection side of the main device and the multiplexing/demultiplexing section of the protection side of each expansion device.

According to the present invention, to transmit the above switching instruction, the overhead portion of the optical communication frame defined according to an optical communication standard is used.

Thus, according to the present invention, it is possible to increase a use rate of software resources for optical communication.

According to the present invention, if the switching instruction from the main device cannot be received when a current switched sate is a protection side, the expansion device side working/protection switching control section controls switching of the own device to the working side.

According to the present invention, when it is detected that each expansion device cannot receive the switching instruction to be received from the main device due to a line trouble, the own device is switched to the working side.

Thus, according to the present invention, even when each expansion device cannot receive the switching instruction from the main device, unified switching between the working and protection sides in the entire system is enabled, and redundancy can be achieved for the system.

According to the present invention, if all the degrees of troubles of the plurality of optical lines for both the working and protection sides in one of the plurality of expansion devices are not good, the integrating section excludes the trouble information of the expansion device from an integration target.

According to the present invention, when the trouble information of, among the plurality of optical lines for connecting the main device and the expansion devices, the optical line for transmitting a signal from the expansion devices to the main device are collected for each of the working and protection sides, if it is determined based on the collected trouble information that all the degrees of troubles of the plurality of optical lines in both the working and protection sides of the plurality of expansion devices are not good, the main device excludes the trouble information of the expansion devices from integration target.

Thus, according to the present invention, with priority given to a relation with a normal device among the expansion devices, it is possible to make switching determination in the entire system, and to achieve redundancy of the system.

According to the present invention, it is possible to realize proper switching within a short time by facilitating determination of switching between the working and protection sides.

BRIEF DESCRIPTION OF THE DRAWINGS

FIG. 1 is a diagram showing connection among optical transmission devices;

FIG. 3 is a diagram showing trouble information integration in a main device;

FIG. 4 is a diagram showing a trouble information type and trouble priority;

FIGS. 7A and 7B are diagrams showing a K1/K2 byte using method;

FIG. 8 is a diagram showing a trouble point conversion table;

DESCRIPTION OF THE PREFERRED EMBODIMENTS

<Outline of Embodiment of the Invention>

To explain an embodiment of the present invention, an outline thereof will first be given. FIG. 1 is an explanatory diagram of an outline of an optical transmission system according to this embodiment of the present invention. FIG. 1 shows inter-optical transmission device connection in which a main device and two expansion devices constituting the optical transmission system are interconnected. The main device corresponds to a main device of the present invention, and the expansion devices correspond to expansion devices of the present invention. The main device 11 and the expansion devices 21 and 31 are interconnected through a plurality of optical fibers 41. Each of the optical transmission devices 11, 21, and 31 includes two communication units which include multiplexer/demultiplexer sections (MUX/DMUX sections). One of the two communication units is used as a working (WK) communication unit, and the other is used as a protection (PT) communication unit. The multiplexer/demultiplexer section (MUX/DMUX section) corresponds to a multiplexer/demultiplexer section of the present invention.

The WK communication units (communication units #3 and #5) of the expansion devices 21 and 31 are connected through the optical fibers 41 to the WK communication unit (communication unit #1) of the main device 11. Similarly, the PT communication units (communication units #4 and #6) of the expansion devices 21 and 31 are connected through the optical fibers 41 to the PT communication unit (communication unit #2) of the main device 11.

Figure 2B:
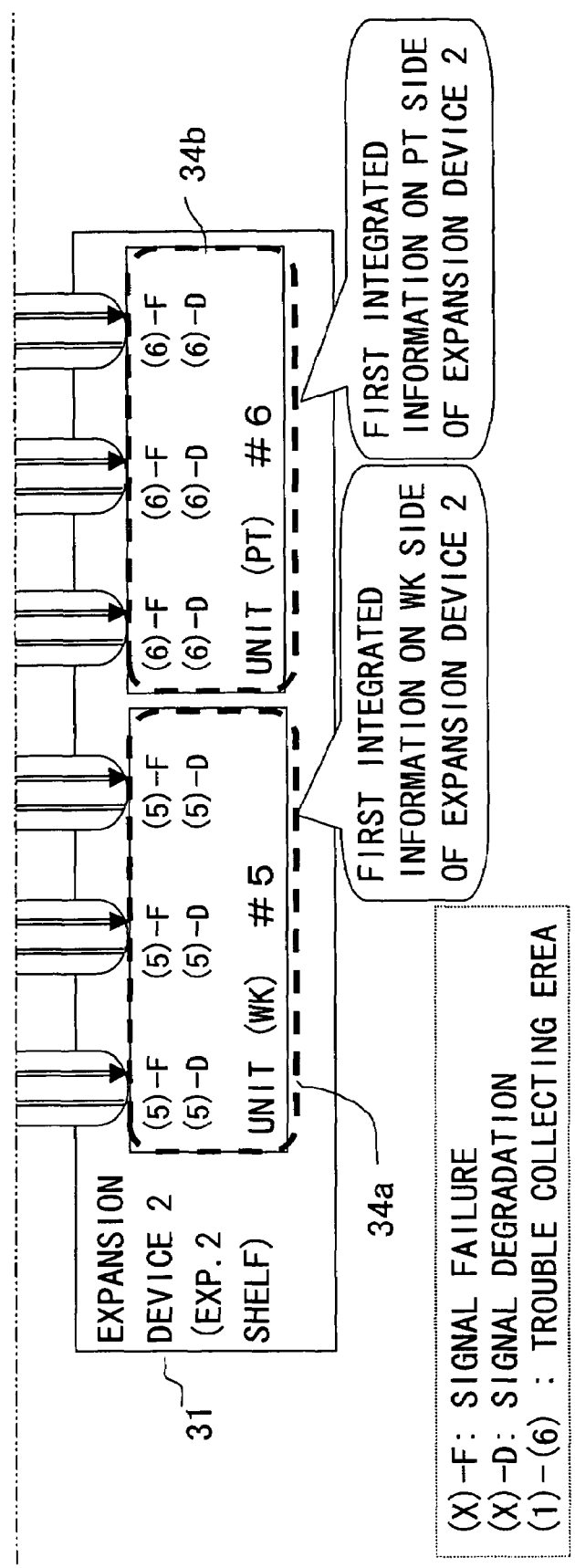
FIG. 2 (FIGS. 2A and 2B) is a diagram showing trouble information collection in the optical transmission devices.

According to this embodiment, each of the optical transmission devices collects trouble information. Next, description will be made of how trouble information regarding each of the optical transmission devices are collected in a connection constitution of the optical transmission devices shown in FIG. 1. FIG. 2 is a diagram showing an outline of collection of trouble information by each of the optical transmission devices. The trouble information is information regarding troubles which need unit switching (switching between the WK and PT sides), and there are troubles of the unit system such as a failure of a unit itself (board or the like), unit omission, and a power supply trouble, and line troubles such as optical signal degradation.

To begin with, in the expansion devices 21 and 31, regarding the WK and PT communication units, line troubles of sides in which the communication units receive signals, and unit troubles of the communication units are individually collected.

For example, in an example shown in FIG. 2, for the WK communication unit #3 of the expansion device 21, a line trouble concerning a line for receiving an optical signal from the WK communication unit #1 of the main device 11, and a unit trouble of the communication unit #3 are collected. In addition, for the PT communication unit #4 of the expansion device 21, a line trouble concerning a line for receiving the optical signal from the communication unit #1, and a unit trouble of the communication unit #4 are collected, and the collected trouble information are integrated.

In the expansion device 31, as in the case of the expansion device 21, line troubles and unit troubles are collected for the WK communication unit #5 and the PT communication unit #6, and the collected trouble information are integrated.

On the other hand, in the main device 11, for the WK and PT communication units #1 and #2, by a method similar to that of each of the expansion devices 21 and 31, trouble information regarding line and unit troubles are collected, and integrated. That is, for the communication unit #1 of the main device 11, a line trouble concerning a line for receiving an optical signal from the communication unit #3 of the expansion device 21, and a unit trouble of the communication unit #1 are collected, and integrated. A line trouble regarding a line through which the communication unit #1 receives an optical signal from the communication unit #5 of the expansion device 31, and the unit trouble of the communication unit #1 are collected, and integrated. In addition, for the PT communication unit #2 of the main device 11, collection and integration processing similar to that of the trouble information regarding the communication unit #1 is carried out.

The integrated trouble information are represented by states of, e.g., "(X)-F", "(X)-D" and the like. The "(X)" is identification information of a communication unit. For example, if a communication unit is the WK communication unit #3 of the expansion device 21, "(X)" is "(3)". The "F" is a state of a signal failure (fail), and the "(D)" is a state of signal degradation (degrade).

Note that, in the examples shown in FIGS. 1 and 2, the communication units are interconnected through three optical tape fibers which constitute the optical fiber 41, and trouble information are integrated for each optical tape fiber. The trouble information integrated for each communication unit is referred to as first integrated information. For example, for the communication unit #3, the first integrated information is "(3)-F" and "(3)-D" for each optical tape fiber.

The main device 11 collects the trouble information collected and integrated for each communication unit of the optical transmission device, and integrates for each of the WK and PT sides. Next, description will be made of how the first integrated information obtained as described above for each communication unit of the optical transmission device is further integrated as a system. FIG. 3 is a diagram showing an outline of integration of trouble information in the main device. The first integrated information collected in the expansion devices 21 and 31 shown in FIG. 2 is notified to the main device 11 through the optical line for connecting the optical transmission devices.

In the main device 11, second integrated information that integrates the first integrated information is created for each of the WK and PT communication units, and each communication unit of the expansion device side connected to the communication unit. That is, for the WK communication unit #1 of the main device 11, second integrated information 49a that integrates first integrated information 24a of the communication unit #3 notified from the expansion device 21 and first integrated information 14a concerning the communication unit #3 of the communication unit #1 is created. Similarly, second integrated information 49c that integrates first integrated information 34a of the communication unit #5 notified from the expansion device 31 and first integrated information 14c concerning the communication unit #5 of the communication unit #1 is created.

For the PT communication unit #2 of the main device 11, second integrated information 49b that integrates first integrated information 24b of the communication unit #4 notified from the expansion device 21 and first integrated information 14b concerning the communication unit #4 of the communication unit #2 is created. Similarly, second integrated information 49d that integrates first integrated information 34b of a communication unit #6 notified from the expansion device 31 and first integrated information 14d concerning the communication unit #6 of the communication unit #2 is created.

Subsequently, in the main device 11, each second integrated information is converted into a predetermined trouble point. Trouble points are totaled in the WK and PT sides, and results of the totaling are compared with each other. If a result of the comparison is that a trouble point of one side currently in an active state is smaller than that of the other side, a selected state of the side is maintained. On the other hand, if a trouble point of one side currently in the active state is larger than that of the other side, a switching operation of the side of the active state is executed.

That is, for example, when the WK side is in an active state and the PT side is in a standby state, if a trouble point of the WK side is smaller than that of the PT side, the active state of the WK side is maintained. On the other hand, if the trouble point of the WK side is larger than that of the PT side, the WK side is switched to a standby state, and the PT side is switched to an active state. In other words, the side of the active state is switched from the WK side to the PT side. By such simple determination processing, i.e., large and small comparison of trouble points, switching determination processing is carried out between the WK and PT sides in the entire optical transmission system.

The switching processing is executed by giving a switching state notification from the main device 11 to each of the expansion devices 21 and 31. Each of the expansion devices 21 and 31 is constituted to forcibly switch the WK side (working side) to an active state when the switching state notification cannot be received from the main device 11 because of a line trouble or the like. Accordingly, it is possible to maintain a unified switching state as the optical transmission system.

Next, referring to FIG. 4, description will be made of trouble priority which becomes an important indicator to decide a trouble point in the conversion of the trouble information into the trouble point. FIG. 4 is a diagram showing a trouble information type and the trouble priority. The trouble priority is a value indicating seriousness of a trouble. A higher priority value means a more serious trouble situation. A value of each trouble point is set to be larger as the trouble priority is higher.

In an example shown in FIG. 4, in order of high priority, a trouble of each communication unit (UNIT), a line trouble (SF: signal failure), a line trouble (SD: signal degradation), a Manual switching request, and NR (no request: no alarm) are set. The priority are positioned in order of troubles being obstacles to signal transmission.

First, a trouble of the communication unit (UNIT) of the Protect side is highest in the trouble priority. In other words, This is positioned as a most serious trouble. According to this embodiment, as described above, it is because the notification of the first integrated information from each of the expansion devices 21 and 31 to the main device 11, and the notification of the switching state from the main device 11 to each of the expansion devices 21 and 31 are carried out through the optical line for connecting the communication units of the Protect side, and synchronization cannot be set among the communication units of the entire system if the information cannot be transferred among the optical transmission devices. Thus, the trouble is positioned as the most serious trouble. Next, a trouble of the communication unit of the Work side is positioned.

Regarding information of line troubles, the number of optical lines for connecting the optical transmission devices is indicated by n, and higher priority is set in order of larger numbers of lines, i.e., in order of the larger number of lines in which troubles occur. For SF-n, the line trouble of the Protect side is higher in priority than that of the Work side. As in the aforementioned case, it is because the first integrated information and the second integrated information are transferred between the optical transmission devices through the line for connecting the communication units of the Protect side.

The trouble priority shown in FIG. 4 is used when the expansion devices 21 and 31 notify the first integrated information 24a, 24b, 34a, and 34b to the main device 11. For example, it is assumed that the communication unit #3 of the expansion device 21 of FIG. 2 detects (3)-F through a first line and a second line of the optical fiber 41, and (3)-D through a third line. In this case, the expansion device 21 determines that SF-2 and SD-1 have been generated in the communication unit #3. Here, the expansion device 21 determines that the SF-2 (Work) is higher in priority than the SD-1 (Work) by using the trouble priority shown in FIG. 4, and notifies the main device 11 that integrated information of the communication unit #3 is the SF-2. Then, the main device 11 creates second integrated information 49a to 49d by using the integrated information notified from the expansion devices 21 and 31.

Embodiment

Next, the embodiment of the present invention will be described. The constitution of the embodiment is illustrative but not limitative of the constitution of the present invention.
<<Device Constitution>>

Figure 5:
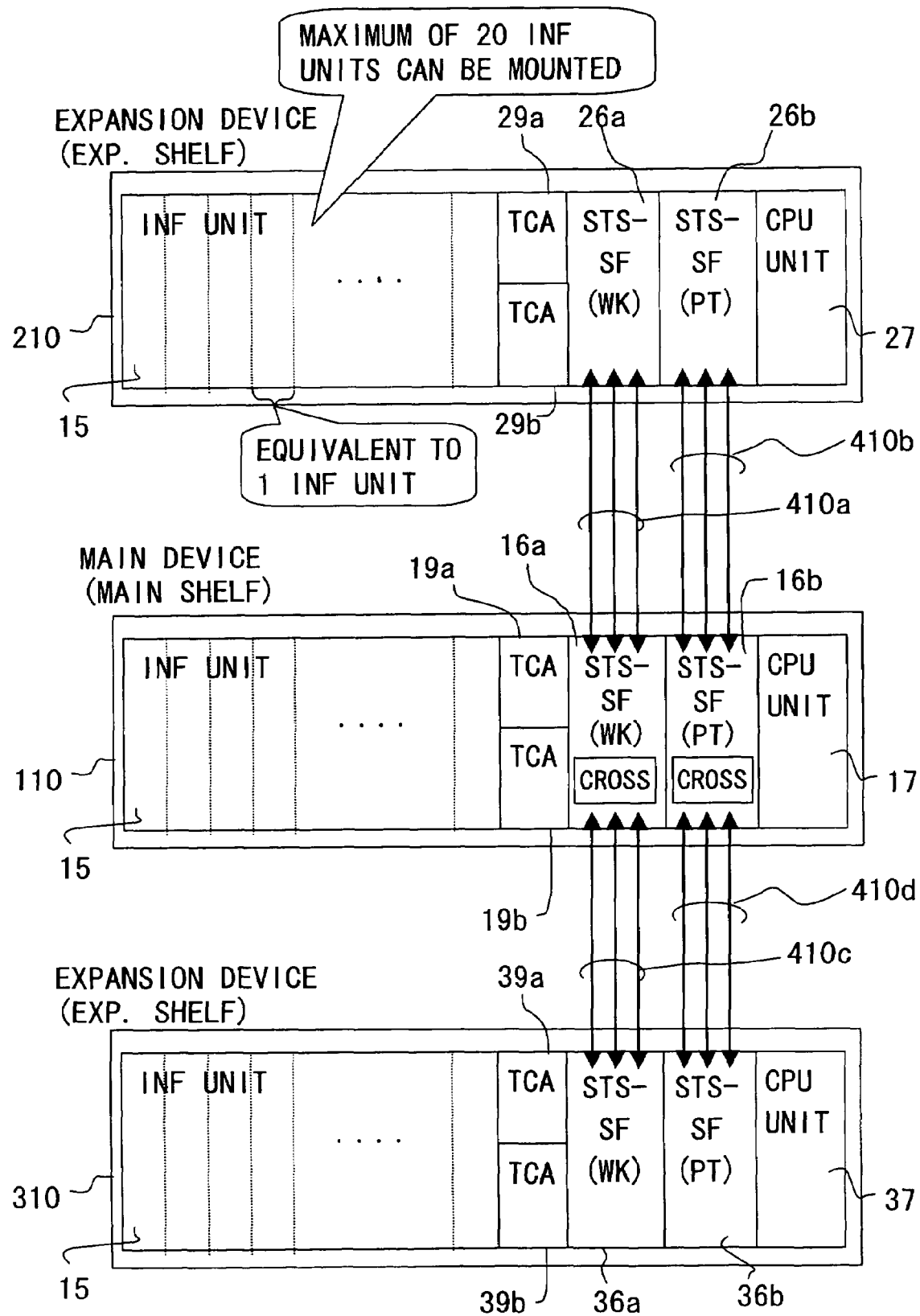
FIG. 5 is a diagram showing an H/W concept in a plurality of optical transmission devices according to an embodiment of the present invention.

FIG. 5 is a diagram showing a hardware (H/W) concept according to the embodiment of the optical transmission system of the present invention. Hereinafter, referring to FIG. 6, the H/W concept constitution of the embodiment of the present invention will be described.

The optical transmission system includes a plurality of optical transmission devices, and the plurality of optical transmission devices include a main device and a plurality of expansion devices connected to the main device. FIG. 5 shows one main device 110, and expansion devices 210, 310 connected through optical fibers 41 to the main device 110. However, the number of expansion devices connected to the main device may be two or more.
<<<Main Device>>>

An H/W constitution of the main device 110 will be described. In FIG. 5, the main device 110 includes a plurality of interface units (INF units) 15, two communication units (STS-SF) 16a, 16b, two TCA units 29a, 29b, and a CPU unit 17.

Each INF unit 15 is composed of an optical interface unit (interface card). The INF unit 15 is connected to the other device through an optical line drawn from the optical interface unit, and has a function of terminating each signal. Note that, the INF units 15 can be mounted up to 20 one optical transmission device.

Each of the communication units 16a and 16b includes a multiplexer/demultiplexer for multiplexing/demultiplexing a signal received by each INF unit 15, and a crossconnecting function of switching an output destination of the signal according to its address. One of the communication units (communication unit 16a here) is used as a communication unit of a WK side (working side), and the other (communication unit 16b) is used as a PT side (protection side). Unit switching means switching of a communication unit of an active state between the communication units 16a and 16b. By the unit switching, the side of the active state is switched between the WK and PT sides.

TCA units 19a and 19b generate clock signals to synchronize the signal received by each INF unit 15 between networks. The TCA units 19a and 19b are disposed for each of the communication units 16a and 16b, and generate clock signals for each of the communication units.

The CPU unit 17 includes a CPU (Central Processing Unit), a memory, an I/O interface, and the like. The CPU executes a program stored in the memory to control operations of the INF units 15 and the communication units 16a and 16b, and manages information thereby obtained en bloc. In addition, the CPU unit 17 controls transfer of signals with the expansion devices 210 and 310 through the communication units 16a and 16b.
<<<Expansion Device>>>

The expansion devices 210 and 310 are similar in constitution to each other. The expansion devices 210 and 310 are similar in constitution to the main device 110. However, communication units 26a, 26b, and the communication units 36a, 36b of the expansion devices 210 and 310 have no crossconnecting functions. This point is different from the main device 110. It is because by mounting the crossconnecting function on the main device 110 alone and executing the signal connection management in the main device 110 alone, complex management of signal connection conversion is unified and simplified.
<<<Connection Constitution>>>

The communication unit 16a of the main device 110 is connected through an optical fiber 410a to the communication unit 26a of the expansion device 210, and through an optical fiber 410c to the communication unit 36a of the expansion device 310. In addition, the communication unit 16b of the main device 110 is connected through an optical fiber 410b to the communication unit 26b of the expansion device 210, and through an optical fiber 410d to the communication unit 36b of the expansion device 310.

Each of the optical fibers 410a, 410b, 410c, and 410d is composed of three optical tape fibers. In one optical tape fiber, transmission/reception of optical signals through 12 lines is realized. In addition, by using an overhead portion of one optical line in one optical tape fiber for connecting the communication units of the PT side, switching between the WK and PT sides, i.e., transfer of information for unit switching, is executed.

<<Functional Constitution of Device>>

Figure 6B:
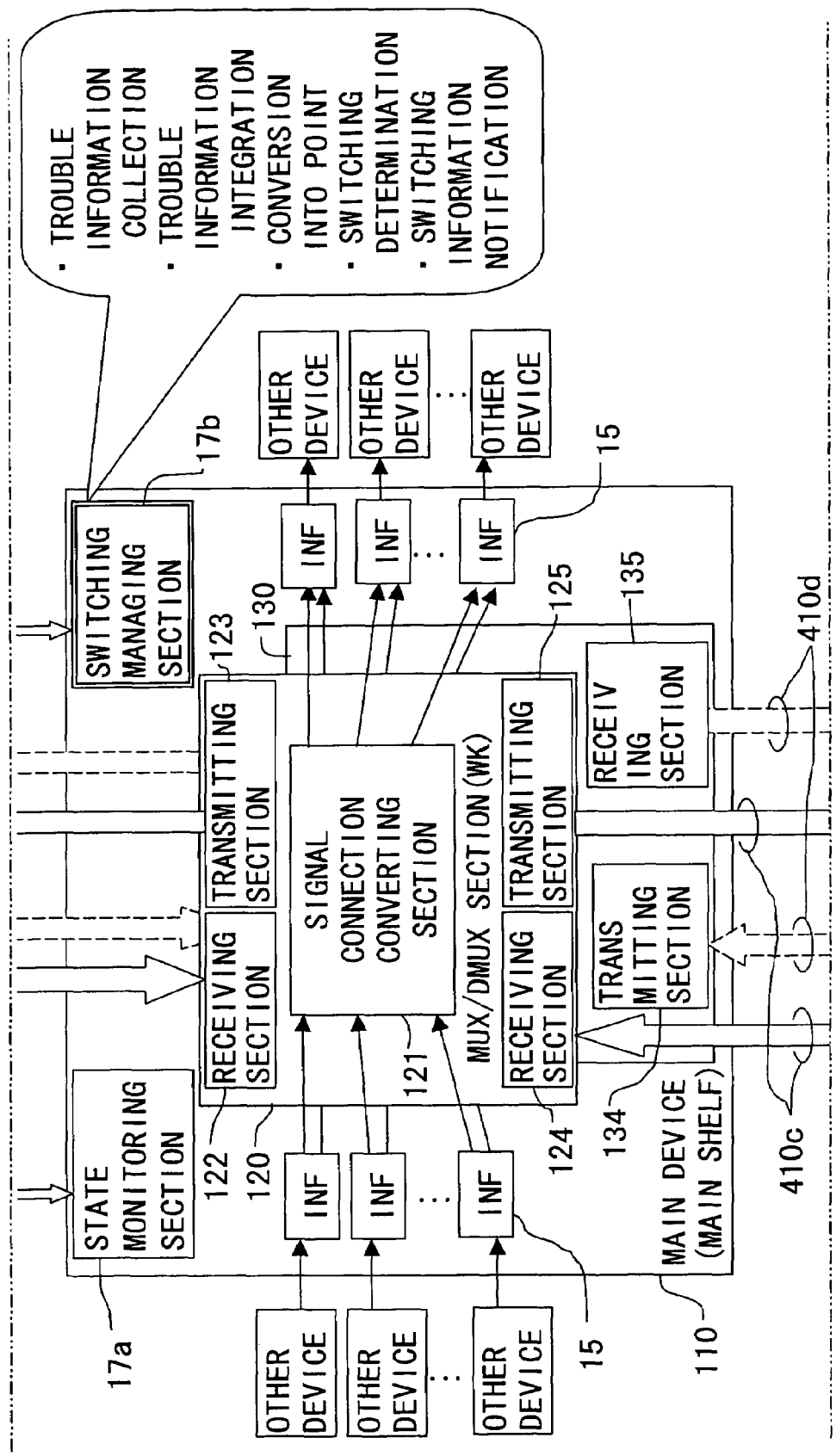
FIG. 6 (FIGS. 6A, 6B, and 6C) is a diagram showing a functional constitution in the plurality of optical transmission devices according to the embodiment of an optical transmission system of the present invention.
Figure 6C:
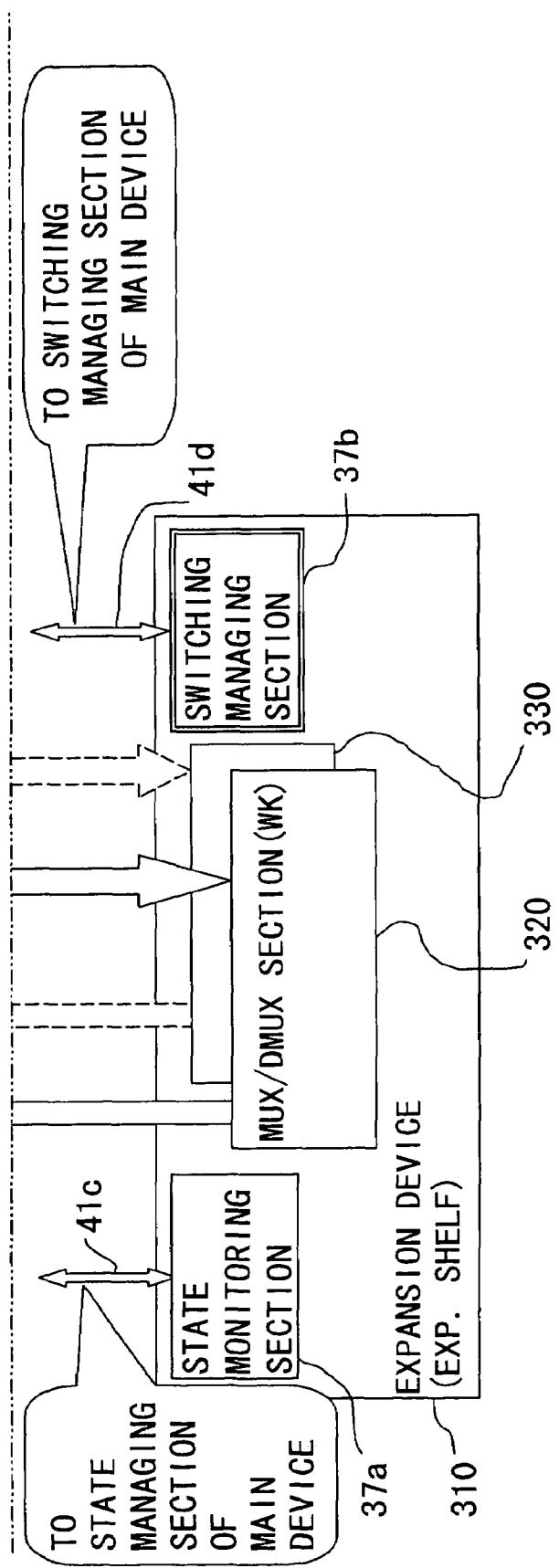

Next, description will be made of a functional constitution in the device shown in FIG. 5. FIG. 6 is a diagram showing a functional block of the optical transmission system shown in FIG. 5. Reference numerals of FIG. 6 are denoted by similar reference numerals for similar portions in correspondence to the H/W concept constitution of FIG. 5.

In FIG. 6, the main device 110 includes a plurality of interface units (INF) 15 for transmitting/receiving an optical signal with the other device, MUX/DMUX sections 120 and 130 to which each INF 15 is connected, a state monitoring section 17a, and a switching managing section 17b. The MUX/DMUX section 120 includes a signal connection converting section 121 for realizing a crossconnecting function, a receiving section 122 and a transmitting section 123 to which the optical fiber 410a is connected, and a receiving section 124 and a transmitting section 125 to which the optical fiber 410c is connected. The MUX/DMUX section 130 includes a signal connection converting section 131 (not shown) for realizing a crossconnecting function, receiving sections 132 and 133 (not shown) to which the optical fiber 410b is connected, and a receiving section 134 and a transmitting section 135 to which the optical fiber 410d is connected. Note that, the signal connection converting section 121 corresponds to a switching section of the present invention.

Expansion devices 210 and 310 are similar in constitution. The expansion device 210 (310) includes a plurality of INF units 15, MUX/DMUX sections 220 and 230 (320 and 330) to which each of the plurality of INF units 15 is connected, a state monitoring section 27a (37a), and a switching managing section 27b (37b).

According to the optical transmission system of this embodiment, the signal connection converting sections 121 and 131 are disposed in the MUX/DMUX sections 120 and 130 alone of the main device 110, signals received by the main device 110 and the expansion devices 210 and 310 are input to the MUX/DMUX sections 120 and 130 of the main device 110, and signal connection is concentratedly executed by the signal connection converting sections 121 and 131. Accordingly, the signal connection can be unified management by the main device 110.

Moreover, according to the optical transmission system of this embodiment, the two communication units are disposed in each optical transmission device. The redundant constitution is employed in which one of the communication unit becomes a WK side, the other becomes a PT side and, by switching, one of the WK and PT sides is set in an active state while the other is set in a standby state. The side of the WK and PT sides that can provide a good signal transmission state is set in an active state.

Selection of the active state side is carried out as follows according to this embodiment. The signal received by each INF 15 is input to the communication unit (MUX/DMUX section) of each of the WK and PT sides. Each communication unit (MUX/DMUX section) processes the input signal, and outputs the signal to the INF 15 of the signal transmission side.

Each INF 15 is constituted to receive a signal from the communication unit (MUX/DMUX section) of each of the WK and PT sides. The INF 15 includes a selector for selecting one of the signals received from the communication units. The signal of the side selected by the selector, outputs from the INF 15 after necessary processing. On the other hand, the signal not selected by the selector is discarded. Accordingly, the side of the signal selected by the selector is set in an active state. Switching control of the selector of the INF 15 is carried out by the switching control section.

Hereinafter, the components of the main device 110, and the expansion devices 210, 310 will individually be described.

(MUX/DMUX Sections)

The MUX/DMUX sections 120 and 130 of the main device 110 serve as signal multiplexing/demultiplexing functions of the communication units 16a and 16b shown in FIG. 5 (multiplexers/demultiplexers). The MUX/DMUX section (WK) 120 belongs to the WK side, and the MUX/DMUX section (PT) 130 belongs to the PT side.

The MUX/DMUX sections 120 and 130 carry out similar operations. To explain by taking the example of the MUX/DMUX section 120, a signal which is a result of conversion of an optical signal received by each INF 15 of the main device 110 from the other device into an electric signal, and signals which are results of conversion of optical signals received by the receiving sections 122 and 124 from the expansion devices 210 and 310 into electric signals are input to the MUX/DMUX section 120. The MUX/DMUX section 120 multiplexes or demultiplexes the input signal when necessary, and inputs to the signal connection converting section 121.

The signal connection converting section 121 switches an output destination of each input signal according to its address. The MUX/DMUX section 120 multiplexes or demultiplexes each signal output from the signal connection converting section 121 when necessary, and sends to one of the INF 15 and the transmitting sections 123 and 125 according to its address.

The MUX/DMUX sections 220 and 230 (320 and 330) of the expansion devices 210 and 310 are different from the MUX/DMUX sections 120 and 130 in that no signal connection converting section is disposed to unify signal connection management. The MUX/DMUX sections 220 and 230 (320 and 330) include receiving and transmitting sections. The MUX/DMUX section 220 (320) is connected through the optical fiber 410a (410c) to the MUX/DMUX section 120. The MUX/DMUX section 230 (330) is connected through the optical fiber 410b (410d) to the MUX/DMUX section 130.

(Transmitting Section and Receiving Section)

Receiving sections 122 and 124 of the MUX/DMUX section 120 of the WK side have functions of receiving optical signals of the WK side transmitted from the expansion devices 210 and 310 (MUX/DMUX sections 220 and 320) through the optical fibers 410a and 410c, converting into electric signals, and outputting. The transmitting sections 123 and 125 of the MUX/DMUX section 120 convert signals to be sent to the WK sides (MUX/DMUX sections 220 and 320) of the expansion devices 210 and 310 into optical forms, and send to the optical fibers 410a and 410c.

Receiving sections 132 and 134 of the MUX/DMUX section 130 of the PT side have functions of receiving optical signals of the PT side transmitted from the expansion devices 210 and 310 (MUX/DMUX sections 230 and 330) through the optical fibers 410b and 410d, converting into electric signals, and outputting. The transmitting sections 133 and 135 of the MUX/DMUX section 130 convert signals to be sent to the PT sides (MUX/DMUX sections 230 and 330) of the expansion devices 210 and 310 into optical signals, and send to the optical fibers 410b and 410d. Various trouble information, and information for unit switching are also transmitted/received.

(Signal Connection Converting Section)

The signal switching converting sections 121 and 131 are realized by the crossconnecting functions of the communication units 16a and 16b, and present in the MUX/DMUX sections 120 and 130 of the main device 110. The signal connection converting section executes signal connection switching between the INF units 15 of the main device 110 and the expansion devices 210 and 310. Accordingly, as compared with management of the signal connection switching executed by each optical transmission device, it is possible to simplify management based on unified management by one optical transmission device of the described constitution.

(State Monitoring Section)

The state monitoring section 17a is a function realized by the CPU unit 17. The state monitoring section 17a monitors states of the communication units 16a and 16b, a trouble state of the optical line, and a state of an APS (Auto Protection Switch). Note that, a manual unit switching operation is enabled. The APS state means a unit switching state, i.e., a current switching state or the like in which an operation is carried out in the working unit or the protection unit.

The state monitoring section 17a communicates with state monitoring sections 27a and 37a of the expansion devices 210 and 310, and transmits information regarding a state managed by itself or the like to state monitoring sections 27a and 37a through the communication paths 41a and 41c.

(Switching Managing Section)

The switching managing section 17b of the main device 110, and the switching managing sections 27b and 37b of the expansion devices 210 and 310 are functions realized by the CPU units 17, 27, and 37. The switching managing section 17b corresponds to the main device side trouble information collecting section, the receiving section, the integrating section, the storing section, the converting section, the totaling section, the deciding section, and the main device side WK/PT switching control section of the present invention. The switching managing sections 27b and 37b correspond to the expansion device side trouble information collecting sections, the transmitting sections, and the expansion device side WK/PT switching control sections of the present invention.

Each switching managing section manages unit switching between the WK and PT units of its own shelf. According to this embodiment, determination processing of unit switching is managed in a unified manner by the switching managing section 17b of the main device 110. Thus, the switching managing section 17b of the main device 110 is different in function from the switching managing sections 27b and 37b of the expansion devices 210 and 310.

First, the function of the switching managing section 27b (37b) of the expansion device side will be described. The switching managing section 27b of the expansion device side manages unit switching between the WK and PT sides. The switching managing section 27b mainly has the following functions.

The switching managing section 27b realizes a trouble information collecting function of collecting unit trouble information of its own optical transmission device, line trouble information, and the like. That is, as described above with reference to FIG. 2, the switching managing section 27b collects trouble information regarding line and unit troubles of the communication units 26a and 26b of the WK and PT sides.

Here, the unit trouble information means information regarding a unit failure such as a failure of a unit substrate, a unit trouble such as releasing of a unit from the state of being mounted to the optical transmission device, a power supply trouble or the like. The line trouble information means information regarding an optical signal trouble such as a signal loss (LOS) or a frame loss (LOF).

The switching managing section 27b executes first-stage integration of the collected trouble information. That is, for each of the WK and PT sides, the switching managing section 27b creates first integrated information equivalent to the first integrated information 24a described above with reference to FIG. 2 which integrates the collected trouble information for each communication unit.

The first-stage integration means conversion of the collected trouble information into information which integrates contents thereof. In this case, for example, information indicating line troubles are integrated (converted) into information regarding SD-1, SD-2, . . . SD-n (SD: Signal Degrade: signal degradation, the number after "–" indicates the number of trouble lines), SF-1, SF-2, . . . SF-n (SF: Signal Fail: signal failure, the number after "–" indicates the number of trouble lines), and NR (No request: no alarm) or the like. The unit trouble is represented by SF-n (n: maximum number of lines). Then, the switching managing section 27b notifies the first integrated information of the WK and PT sides to the switching managing section 17b of the main device 110. The switching managing section 37b executes processing similar to that of the switching managing section 27b.

Next, the function of the switching managing section 17b of the main device side will be described. The switching managing function 17b mainly has the following functions. First, as in the case of the switching managing section 27b of the expansion device side, the switching managing section 17b collects unit trouble information of its own shelf, line trouble information, and the like, and creates first integrated information of the WK and PT sides (equivalent to the first integrated information 14a to 14d described above with reference to FIG. 2) for each expansion device.

Second, the switching managing section 17b creates second integrated information. That is, the switching managing section 17b receives the first integrated information notified from each of the expansion devices 210 and 310, and creates second integrated information which integrates corresponding first integrated information (equivalent to the second integrated information 49a to 49d described above with reference to FIG. 3) for each of the WK and PT sides, and each of the expansion devices 210 and 310 by using the first integrated information created by itself and the notified first integrated information.

According to this embodiment, one of triggers to collect the first integrated information is a hardware interruption when each trouble occurs. Thus, a case may be imagined in which by a certain timing a new trouble occurs in the expansion device 210 alone while no new troubles occur in the other optical transmission devices. In this case, first integrated information is not created in all the optical transmission devices each time. The main device 110 uses the previous first integrated information regarding the optical transmission device in which no new troubles occur when the main device 110 creates second integrated information.

For example, it is assumed that a new trouble occurs in the expansion device 210 alone. In such a case, first, the switching managing section 17b receives the first integrated information notified from the expansion device 210 (in this case, no first integrated information is notified from the expansion device 310). Then, the switching managing section 17b creates second integrated information by using the first integrated information created by itself previously, new first integrated information notified from the expansion device 210, and the first integrated information previously notified from the expansion device 310. Accordingly, it is possible to create integrated information of the entire system more quickly when a trouble occurs.

Third, the switching managing section 17b converts each second integrated information into a trouble point. Fourth, the switching managing section 17b compares trouble points of the WK ands PT sides with each other, and executes unit switching determination. Fifth, the switching managing section 17b notifies unit switching information decided by the unit switching determination to the expansion devices 210 and 310.

The main device 110 and the expansion devices 210 and 310 are interconnected through the optical fibers 410a to 410d. The communication paths 41b and 41d are disposed to execute mutual information transfer between the switching managing section 17b of the main device 110 and the switching managing sections 27b and 37b of the expansion devices 210 and 310. The switching managing sections 27b and 37b transmit the collected trouble information (first integrated information) of their own optical transmission devices (expansion devices 210 and 310) through the communication paths 41b and 41d to the switching managing section 17b. The switching managing section 17b transmits the unit switching information decided by the unit switching determination through the communication paths 41b and 41d to the switching managing sections 27b and 37b.

Each of the communication paths 41b and 41d is disposed on each of the optical fibers 410b and 410d of the PT side. Note that, the state monitoring section 17a transfers information with the state monitoring sections 27a and 37a through the communication paths 41a and 41c. The communication paths 41a and 41c are constituted by using proper lines on the optical fibers 410a to 410d.

<<Message Exchanged Between Switching Managing Sections>>

Figure 7B:
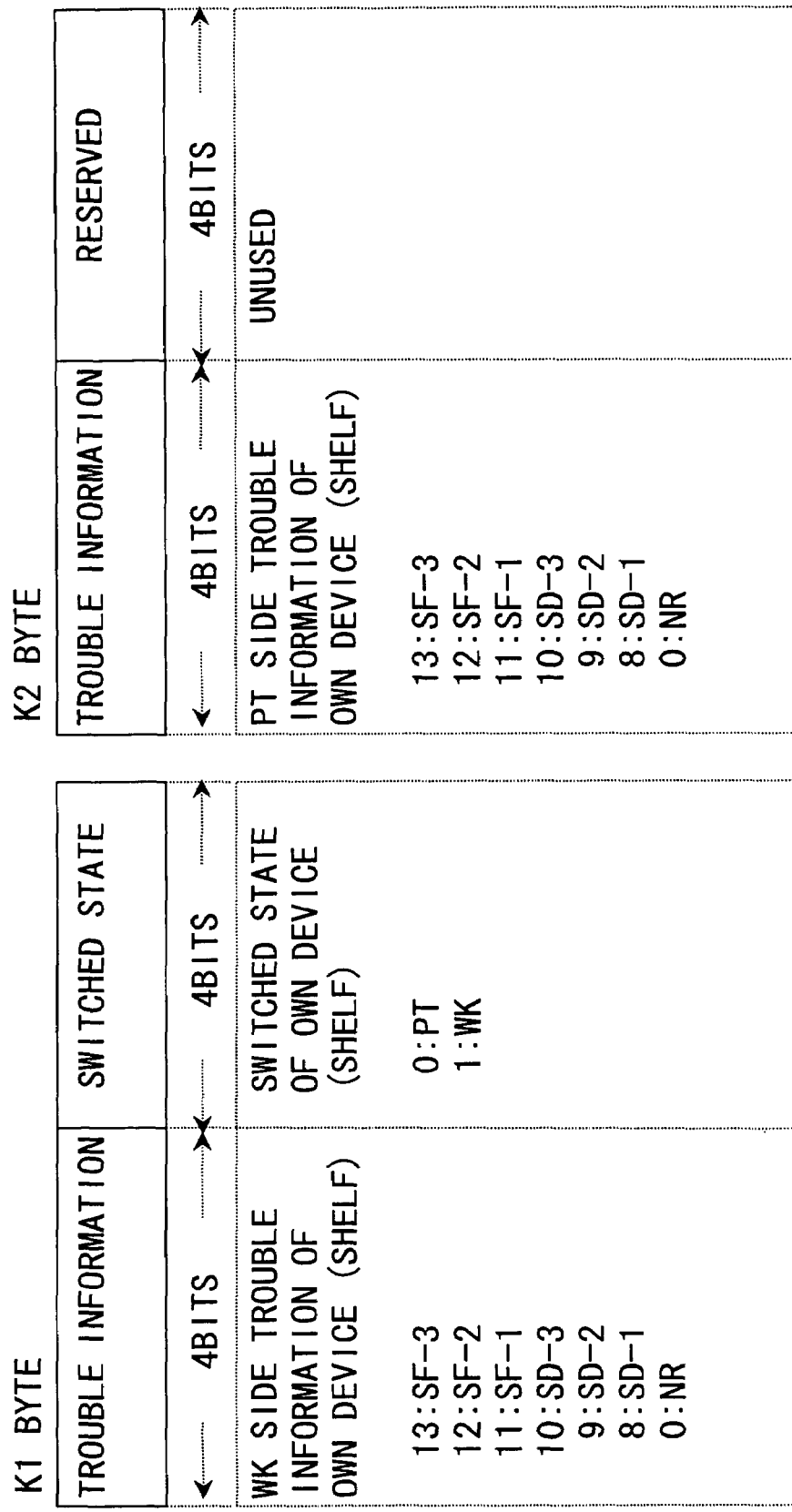

Next, description will be made of messages exchanged between the switching managing section 17b of the main device and the switching managing sections 27b and 37b of the expansion devices 210 and 310. FIG. 7A is an explanatory diagram of a message transmitted from the main device 110 to each of the expansion devices 210 and 310. FIG. 7B is an explanatory diagram of a message transmitted from each of the expansion devices 210 and 310 to the main device 110.

Information is exchanged by using an overhead byte set on a SOH (section overhead) of a frame format defined by SONET (Synchronous Optical NETwork) which is a high-speed digital communication system using an optical fiber. In this case, a K1/K2 byte used for executing normal line switching in the SOH is used. A method of using the K1/K2 bytes is defined according to a standard. However, according to this embodiment, since being used for unit switching, a standard overhead using method is changed.

As shown in FIG. 7A, the K1 byte transmitted from the main device to the expansion device is divided into upper 4 bits and lower 4 bits. In the upper 4 bits, a trouble code indicating a cause of system switching is set as a trouble code (trouble information). In the lower 4 bits, a switching state, i.e., switching instruction for the expansion device, is set. Here, one of switching instruction for the PT side "0:PT" and switching instruction for the WK side "1:WK" is set.

In addition, as in the case of the K1 byte, the K2 byte transmitted from the main device to the expansion device is divided into upper 4 bits and lower 4 bits. In the upper 4 bits, a trouble code indicating contents of trouble information (first integrated information) of the PT side (PT) of the own optical transmission device (main device 110) is set as trouble code (trouble information). The lower 4 bits are not used as a reservation area.

On the other hand, as shown in FIG. 7B, the K1 byte transmitted from each expansion device to the main device is divided into upper 4 bits and lower 4 bits. In the upper 4 bits, a trouble code indicating contents of trouble information (first integrated information) of the WK side (WK) of the own shelf (each of the expansion devices 210 and 310) is set as trouble information. In the lower 4 bits, a code indicating a current switching state of the own shelf is set as a switching state.

The K2 byte transmitted from the expansion device to the main device is also divided into upper 4 bits and lower 4 bits. In the upper 4 bits, a trouble code indicating contents of trouble information (first integrated information) of the PT side (PT) of the own shelf (each of the expansion devices 210 and 310) is set as trouble information. The lower 4 bits are not used as a reservation area.

Now, the trouble codes set in the K1 byte and the K2 byte will be described. In the example, the trouble codes take values of "0" to "14". "NR (No Request)" is allocated to the trouble code "0". The "NR" indicates that there are no troubles to be notified. "MAN (MANual switching request)" is set for the trouble code "7".

"SD (Signal Degrade: signal degradation)-x" is allocated to each of the trouble codes "8" to "10". "SF (Signal Fail: signal failure)-x" is allocated to each of the trouble codes "11" to "13". The "x" is a value indicating a degree of signal degradation. According to the embodiment, each of the optical fibers 410a to 410d for connecting the communication units is composed of three optical tape fibers. The number of optical tape fibers having lines of troubles (signal degradation or signal failure) is set to a value of the "x". Thus, one of values of "1" to "3" is set for the "x" according to the number of optical tape fibers of troubles. As a value of the "x" is larger, a degree of a trouble is higher. Further, "FRCD (FORCED: forced switching)" is allocated to the trouble code "14". The "FRCD" means switching more forcible than the "MAN" of the trouble code "7".

In each of FIGS. 7A and 7B, one trouble code indicating contents of the first integrated information is notified. Thus, each of the switching managing sections 17b, 27b, and 37b is constituted to create first integrated information according to trouble priority definition (degree of a trouble) similar to that shown in FIG. 5, and notify a corresponding trouble code.

For example, it is assumed that the switching managing section 27b detects "(3)-F" and "(3)-D" for the three optical tape fibers constituting the optical fiber 410a as trouble information for the WK side. It is also assumed that there are one signal degradation and one signal failure for each of the three optical fibers. In this case, "SD-1" and "SF-1" are obtained as trouble information. Accordingly, if a plurality of kinds of trouble information are obtained, the switching managing section 27b selects trouble information of a highest trouble degree as first integrated information according to the trouble priority. In the example, since the "SF-1" is higher in trouble priority than the "SD-1", the "SF-1" is selected as first integrated information, and becomes a target of notification.

The number of troubles for the SD or the SF is notified as described above, whereby a switching state in which signal cutting-off due to a trouble is more difficult to occur can be determined. However, according to the embodiment, as described above, the notification of the switching state is executed between the switching managing sections through the communication paths (41b and 41d) using any one of optional optical tape fiber of the protection side. Thus, if a trouble occurs in the optical tape fiber in which the communication paths 41b and 41d are formed, a value of the "x" is set to a maximum (3). This means that the trouble is treated as a largest trouble because impossible reception of the state notification creates a possibility of a contradiction in switching in the entire system.

The overhead using method shown in FIG. 7 can increase a use rate of line switching software by making a format similar to that defined according to the standard of GR253.

<<Trouble Point>>

Next, description will be made of the function of the switching managing section 17b to convert the second integrated information into a trouble point. As described above, the switching managing section 17b creates the second integrated information that integrates the first integrated information. The second integrated information is created by a method similar to that of the first integrated information. That is, as information to create the second integrated information, first integrated information of the main device side and first integrated information of the expansion device side are prepared. The switching managing section 17b determines large and small trouble priority of the first integrated information, and selects the higher first integrated information as the second integrated information.

For example, when the second integrated information of the WK side is created between the main device 110 and the expansion device 210, the switching managing section 17b compares the trouble priority of the first integrated information of the WK side of the main device 110 side with that of the first integrated information of the WK side of the expansion device 210. At this time, if the first integrated information of the main device side is "SF-1" and that of the expansion device side is "SD-1", the switching managing section 17b selects the "SF-1" as the second integrated information.

Here, the trouble priority is set to be higher as the number of optical tape fibers having troubles is higher in the case of troubles of the same kind. Thus, for example, if the first integrated information of the main device side is "SD-3", and that of the expansion device side is "SD-1", the switching managing section 17b selects the "SD-3" as the second integrated information.

In the case of a mixture of SD and SF troubles, the "SF-1" is set to be higher in trouble priority than the "SD-3". This is because signal cutting-off occurs in the case of the SF while signal deterioration is recognized but no signal cutting-off occurs in the case of the SD.

When the switching managing section 17b converts the second integrated information into a trouble point, the switching managing section 17b refers to a trouble point conversion table as shown in FIG. 8. For example, the trouble point conversion table is created in the memory of the CPU unit 17. The switching managing section 17b executes conversion into a trouble point by reading the trouble point corresponding to the second integrated information from the trouble point conversion table.

In the trouble point conversion table, each trouble point is previously defined to match the trouble priority shown in FIG. 5. The trouble priority is a value indicating seriousness of a trouble, and a higher priority means a more serious trouble situation. Thus, a trouble point value is set to be higher as priority is higher.

For example, in the case of occurring an SD or SF trouble, a higher point is defined as the number of trouble lines in the trouble type is larger. That is, a trouble point of an "SD (SF)-2" is set to be higher than a trouble point of an "SD(SF)-1". Note that, trouble points are not uniformly distributed, but points are set according to seriousness of troubles.

Further, in the example shown in FIG. 8, for "SF-3", values of trouble points are different between the WK side (working side) and the PT side (protection side). According to this embodiment, a switching state is notified by using any one of optional optical tape fiber of the protection side. Thus, when SF occurs in the optical tape fiber, switching notification cannot be executed. Upon detection of the SF of the optical tape fiber, the expansion device forcibly executes unit switching to the working side. In this case, the trouble point of the "SF-3" of the protection side is set to be higher than the trouble point of the "SF-3" of the working side so that the main device can follow the switching operation of the expansion device. Thus, when the trouble information of the working side and the trouble information of the protection side in the entire system are integrated to be "SF-3", a trouble point of the protection side is set to be larger.

A unit trouble is treated as independent trouble information in the main device, and a trouble point is defined to be higher than that of a line trouble (SD or SF). A unit trouble of the main device side is defined such that a trouble point of the protection side is higher than that of the working side. Note that, a unit trouble of the expansion device is treated as an SF trouble, and defined by SF-3.

Upon creation of the second integrated information for each expansion device, the switching managing section 17b converts each second integrated information into a trouble point. Subsequently, the switching managing section 17b totals trouble points for the working side and the protection side. Then, the switching managing section 17b compares a totaling result of the working side with a totaling result of the protection side to determine which is larger.

Then, the switching managing section 17b decides the side of the smaller totaling result as a switching state to be selected by the optical transmission system. That is, if the trouble point of the working side is smaller than that of the protection side, the working side is decided as a switching state to be selected. If the trouble point of the protection side is smaller than that of the working side, the protection side is decided as a switching state to be selected.

Subsequently, when the decided switching state does not coincide with a current switching state, the switching managing section 17b executes unit switching of its own optical transmission device (main device 110), and notifies the expansion devices 210, 310 of a switching instruction. Determination conditions may be added such that switching is executed only when a larger value of a trouble point exceeds a predetermined value in the switching determination (determination by comparison of the collecting results with each other). In addition, items (troubles) corresponding to trouble points can be added or point values can be changed in the trouble point conversion table shown in FIG. 8 so that an intended determination result of large and small comparison can be obtained.

OPERATION EXAMPLE

Figure 9:
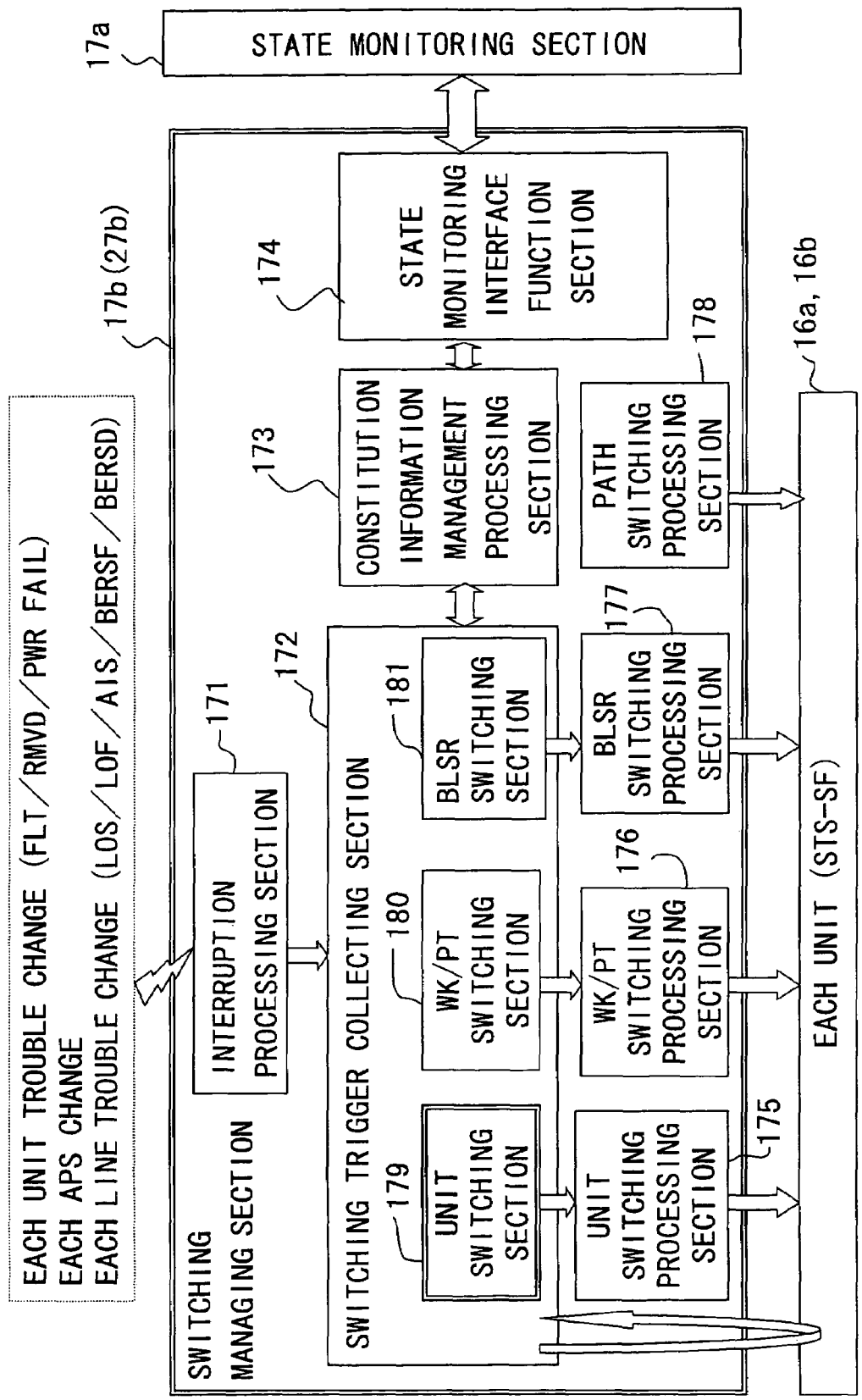
FIG. 9 is a diagram showing a functional constitution of a switching managing section.
Figure 10:
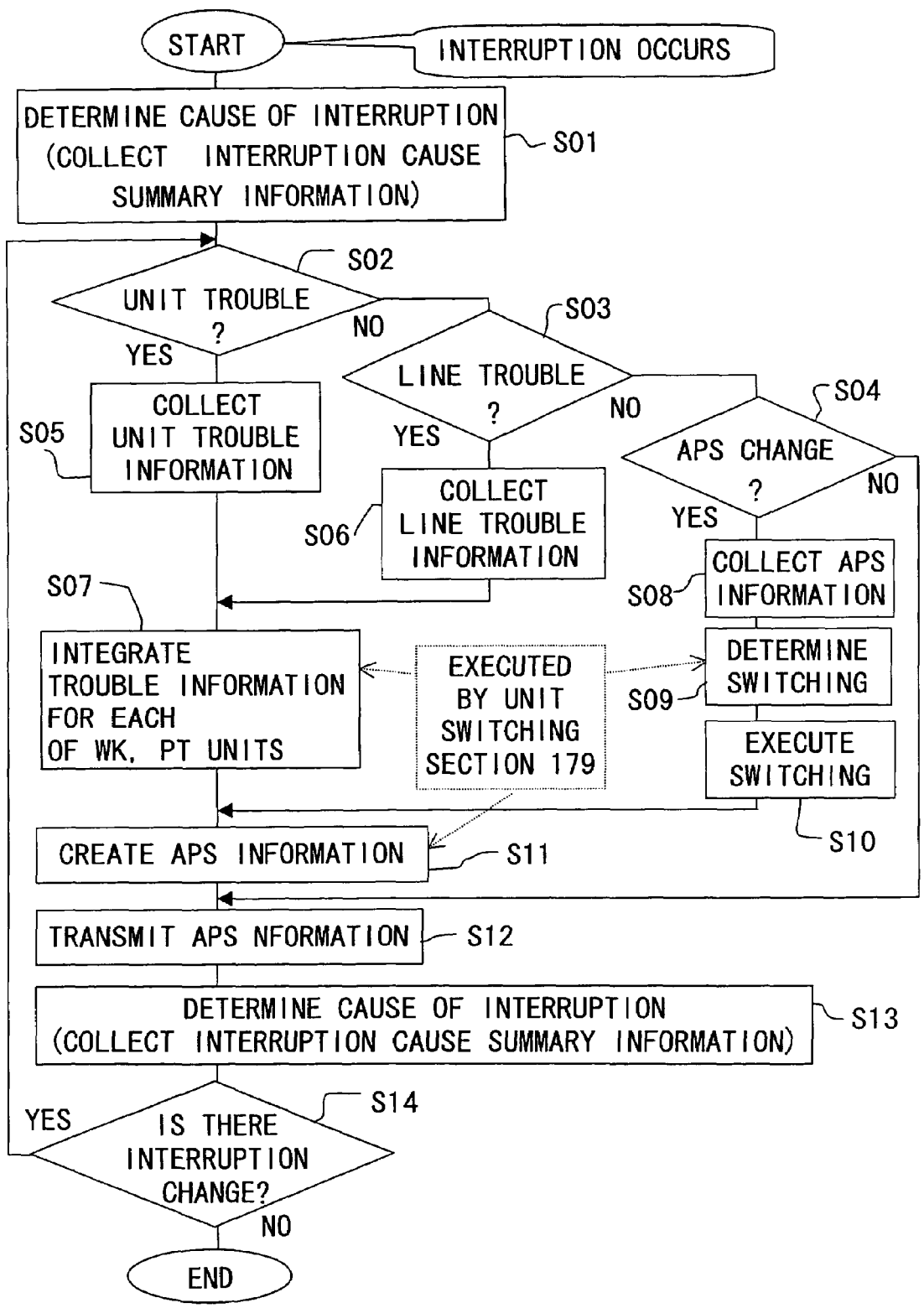
FIG. 10 is a flowchart showing an operation flow of a switching managing section of a expansion device.
Figure 11B:
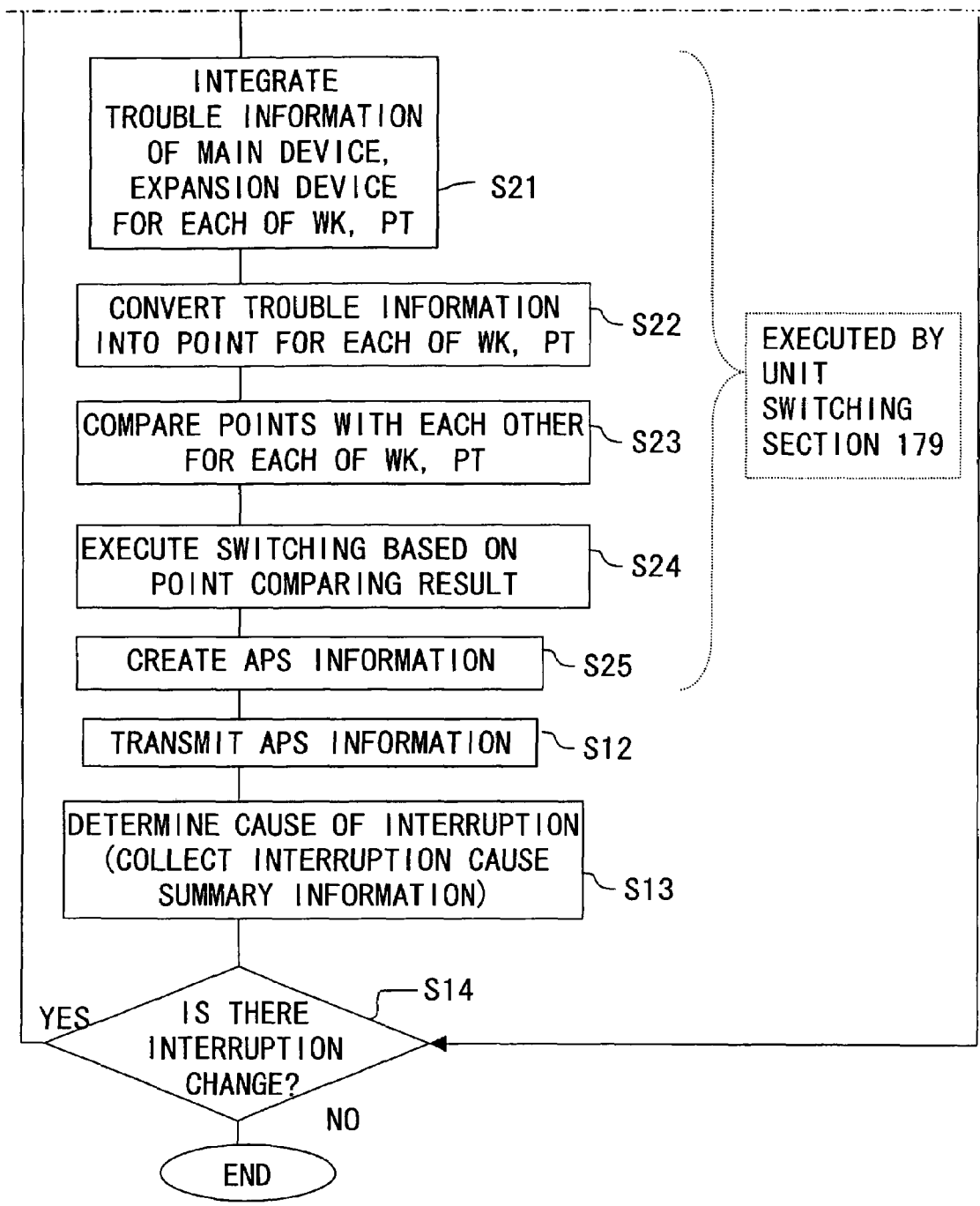
FIG. 11 (FIGS. 11A and 11B) is a flowchart showing an operation flow of a switching managing section of a main device.

Next, referring to FIGS. 9, 10, and 11, operations of the switching managing sections 17b and 27b will be described. FIG. 9 is a diagram showing a functional block of the switching managing section. FIG. 10 is a flowchart showing an operation example of the switching managing section 27b of the expansion device. FIG. 11 is a flowchart showing an operation example of the switching managing section 17b of the main device.

To explain the operations of the switching managing sections, first, referring to FIG. 9, a functional constitution of the switching managing section will be described. In FIG. 9, the switching managing section 17b (27b) functions as a device which includes an interruption processing section 171, a switching trigger collecting section 172, a constitution information management processing section 173, a state monitoring interface function section 174, a unit switching processing section 175, a WK/PT switching processing section 176, a BLSR switching processing section 177, and a path switching processing section 178. Here, the functions for unit switching will mainly be described.

(Interruption Processing Section)

The interruption processing section 171 processes interruptions occurring when various trouble changes occur or when unit switching is notified, and notifies the switching trigger collecting section 172. The interruptions processed by the interruption processing section 171 include a unit trouble change, a line trouble change, and an APS change.

The unit trouble change is an interruption occurring when a trouble concerning a unit (each of STS-SF 16a and 16b) occurs. For example, there are a FLT (unit failure such as unit substrate damage), RMVD (removal of a unit from the optical transmission device), a PWR FAIL (power supply trouble), and the like.

The line trouble change is an interruption occurring when a trouble concerning the optical line occurs. There are a LOS (Loss of Signal: signal input cut-off), a LOF (Loss of Frame: asynchronization of frame), an AIS (Alarm Indication Signal: trouble notifying signal from an optical repeater or the like), a BERSF (Signal Failure: serious trouble), BERSD (Signal Degradation: light trouble), and the like.

The APS change is an interruption occurring when a unit switching notification from the switching managing section 17b of the main device to the expansion device, trouble information integrated by the switching managing section 27b of the expansion device, unit switching information of the expansion device, or the like comes in.

(Switching Trigger Collecting Section)

The switching trigger collecting section 172 includes a unit switching section 179, a WK/PT switching section 180, and a BLSR switching section 181.

The switching trigger collecting section 172 collects trouble information which cause the interruptions based on the interruption information notified by the interruption processing section 171, determines necessary processing based on the collected various trouble information, and notifies each processing section. Then, the collected trouble information in the trouble information such as the SD-x or SF-x described above are integrated, and notified to the unit switching section 179.

The unit switching section 179 integrates the trouble information notified by the switching trigger collecting section 172 for the working side and the protection side, and creates APS information. Then, the APS information is notified to the unit switching processing section 175.

The APS information is a unit switching notification sent from the switching managing section 17b of the main device to the expansion device side, trouble information integrated by the switching managing section 27b of the expansion device, unit switching information of the expansion device, or the like.

(Unit Switching Processing Section)

The unit switching processing section 175 transmits the APS information notified by the unit switching section 179 to the other optical transmission device by the transmitting section (e.g., 123 in FIG. 1) of the MUX/DMUX section of each unit. In addition, based on the APS information, unit switching is executed when unit switching of its own optical transmission device is necessary.

(State Monitoring Interface Function Section, Constitution Information Management Processing Section)

The state monitoring interface function section 174 is an interface between the state monitoring section 17a and the switching managing section 17b, and issues a manual unit switching instruction or the like from the state monitoring section 17a to the constitution information management processing section 173.

The constitution information management processing section 173 obtains information regarding a unit switching state, a line state or the like monitored by the state monitoring section 17a from the switching trigger collection section 172, and issues the unit switching instruction from the state monitoring section 17a to the switching trigger collecting section 172.

(Other Constitutions)

Other constitutions not directly concerning unit switching will briefly be described. The WK/PT switching section 180 determines switching of the lines of the WK side/PT side prepared for each optical line, and notifies the WK/PT switching processing section 176. Accordingly, the WK/PT switching processing section 176 executes line switching of the WK and PT sides for each optical line (not unit). The BLSR switching section 181 determines bypass line switching at the time of a line trouble by a BLSR (Bidirectional Line Switched Ring) system, and notifies the BLSR switching processing section 177. Thus, the BLSR switching processing section 177 executes line bypassing by the BLSR system. The path switching processing section 178 executes signal switching at a path level between terminals.

(Explanation of Operation Flow)

Next, referring to FIG. 10, an operation of the switching managing section 27b of the expansion device will be described. When interruptions such as various trouble changes occur, the interruption processing section 171 of the switching managing section 27b processes the interruptions, and notifies the switching trigger collecting section 172 (see FIG. 9).

Next, in the switching trigger collecting section 172, interruption cause summary information are collected to determine causes of the interruptions (S01). Then, determination is made as to whether the interruption causes are troubles concerning a unit or not based on the interruption cause summary information (S02). If those are troubles concerning the unit (S02; YES), unit trouble information are collected (S05), and notified to the unit switching section 179.

If those are not troubles concerning the unit (S02;NO), determination is made as to whether the interruption causes are troubles concerning the optical line or not (S03). If those are troubles concerning the line (S03; YES), trouble information for the line are collected (S06), and notified to the unit switching section 179. If those are not troubles concerning the line (S03; NO), determination is made as to whether the interruption causes are APS changes or not (S04). If the interruption causes concern the APS changes (S04; YES), APS information are collected (S08), and notified to the unit switching section 179.

Upon reception of the notification from the switching trigger collecting section 172, the unit switching section 179 executes processing according to each notification. If an occurrence cause is a unit trouble or a line trouble, the collected unit and line trouble information are integrated for each unit of the working side or protection side (S07), and APS information (equivalent to first integrated information) such as SD-x, SF-x or NR is created (S11).

If an occurrence cause is an APS change, the notified APS information is a switching notification from the main device 110. In this case, the unit switching section 179 determines whether or not to execute switching processing based on the switching notification (S09), and passes a result of the determination to the unit switching processing section 175. The unit switching processing section 175 executes unit switching according to the determining result of the switching notification (S10). The unit switching section 179 creates a unit state after the switching as APS information (S11). After the creation of the APS information, the APS information is notified to the unit switching processing section 175.

The unit switching processing section 175 transmits the APS information to the main device 110 through a message using the overhead portion (see FIG. 7) by the communication unit of the protection side (S12).

Lastly, the switching trigger collection section 172 newly checks whether or not a trouble change has occurred by occurrence of a new interruption, and ends in case where no change has occurred (S13 and 14). If no change has occurred, the process ends. If a change has occurred, the process returns to the determining processing (S02) again to execute the processing. Note that, the switching managing section 37b of the expansion device 310 executes similar processing.

Next, referring to FIG. 11, an operation of the switching managing section 17b of the main device will be described. In FIG. 11, operations of steps S01 to 08 and S12 to 14 are similar to those of the switching managing section 27b of the expansion device, and thus they are denoted by similar reference numerals to reference numerals of FIG. 10. Operations different from those of the switching managing section 27b of the expansion device alone will be described.

As described above, the APS information of the expansion device is transmitted to the main device 110 from each of the switching managing sections 27b, 37b of the expansion devices. The APS information from the expansion device is determined to be an APS change (S04). Then, such APS information are collected (SO8), and notified to the unit switching section 179.

Upon reception of the notification from the switching trigger collection section 172, the unit switching section 179 integrates trouble information of the main device and the expansion device for each of the working/protection (S21). In other words, trouble types shown in FIG. 8 are created for each of the working/protection of each optical transmission device. The integrating processing (S21) of the trouble information will be described more in detail. If it is determined to be an APS change in S04, i.e., if a new trouble occurs in the expansion device, APS information collected in S08 are trouble information regarding the expansion device undergoing the new trouble occurrence. In this case, to integrate the trouble information (S21), the unit switching section 179 uses the previous trouble information as trouble information of the main device and the expansion device in which no new troubles occur. In addition, if it is determined to be a UNIT trouble of the own shelf (main device) in S02, it is trouble information of the own optical transmission device that are collected in S05. In this case, to integrate the trouble information (S21), the unit switching section 179 uses the previous information as trouble information for each expansion device.

Next, based on each integrated information, the unit switching section 179 refers to the table of FIG. 8 to execute conversion into a trouble point for each of the working and protection sides (S22). Then, the trouble points are compared with each other (S23), unit switching determination is made based on a result of the point comparison, and unit switching is executed by the unit switching processing section 175 (S24). In this case, the point comparison may be large and small comparison.

Then, APS information is creased as a unit switching notification to the expansion device (S25), and the unit switching processing section 175 is requested to transmit the APS information (S12).

Operation Effects of Embodiment

According to the optical transmission system of this embodiment, the two communication units of the working side (WK) and the protection side (PT) are prepared for each of the optical transmission devices which constitute the system, and the optical transmission devices are synchronized with each other to execute unit switching so that one of the WK and PT sides can be selected in the entire system.

To determine such unit switching, the switching managing sections 27b and 37b of the expansion devices 210 and 310 create first integrated information which integrates trouble information regarding the optical fibers 410a and 410b for connecting the communication units of the WK and PT sides, and notifies the switching managing section 17b of the main device 110.

The switching managing section 17b creates first integrated information for each of the WK and PT sides and each expansion device, and creates second integrated information, which integrates the first integrated information notified by each of the expansion devices 210 and 310 and the first integrated information which has been created by itself, for each of the WK and PT sides and each expansion device.

Subsequently, the switching managing section 17b converts each of the second integrated information into a trouble point. A smaller value of the trouble point indicates a better trouble state. Trouble points are totaled for each of the WK and PT sides. Then, the switching managing section 17b compares large and small results of the totaling, and selects a smaller trouble point. Accordingly, the side of a better trouble state is specified. At this time, if the side selected as a result of determination is different from a currently selected side, unit switching is executed.

As described above, according to this embodiment, instead of determining which of a plurality of trouble patterns a current trouble situation belongs to by preparing the plurality of trouble patterns beforehand to execute unit switching, unit switching is determined by converting the current trouble situation into points, and comparing the points between the WK and PT sides. Thus, since determining processing necessary for the unit switching is greatly reduced, it is possible to shorten a time necessary for switching determination, and to shorten a time necessary for the unit switching.

That is, to execute unit switching determination, the unit switching section 179 of the main device 110 integrates trouble information of each unit and converts into a numerical value of a trouble point. Accordingly, subsequent switching determination only requires large and small comparison of trouble points between the working side and the protection side, and thus the switching determination can be completed within a short time.

The main device notifies a result of the switching determination through the optical line to each expansion device, and the expansion device executes switching according to switching instruction issued from the main device. By employing such a constitution, the expansion device need not execute switching determination, and a total switching time of the system (configured by combining the plurality of optical transmission devices) can be shortened.

Since the switching determination needs the trouble point comparison alone, a test of switching determination only becomes point comparison processing in quality evaluation, and an evaluation time can be greatly shortened. Further, a test pattern in quality evaluation only needs to guarantee a normal operation of conversion processing into a trouble point. Thus, enumeration of test patterns is improved, and higher quality functions can be guaranteed.

In addition, since each trouble information is lastly converted into a numerical value, judgment can be made by the same determination such as comparison of numerical values under any trouble situations. In the switching determination, determination conditions that a threshold value is preset and switching is executed when the trouble point exceeds the threshold value, may be added, and future functional expansion will be facilitated.

Furthermore, the trouble point conversion table shown in FIG. 8 enables addition of trouble types and arbitrary change of the switching determination by changing the point value itself. Besides, such a change only needs change of table contents, and thus the change or the like can be facilitated.

<<Case of Communication Cut-off between Main Device and Expansion Device>>

As describe above, the APS information such as the unit switching notification is notified through one optical tape fiber for connecting the communication units of the protection and by using the K1/K2 byte of the overhead portion shown in FIG. 7. Then, the expansion devices 210 and 310 execute switching according to the switching notification from the main device 110, whereby unit switching between the working and the protection of each optical transmission device is synchronized in the system.

Figure 12A:
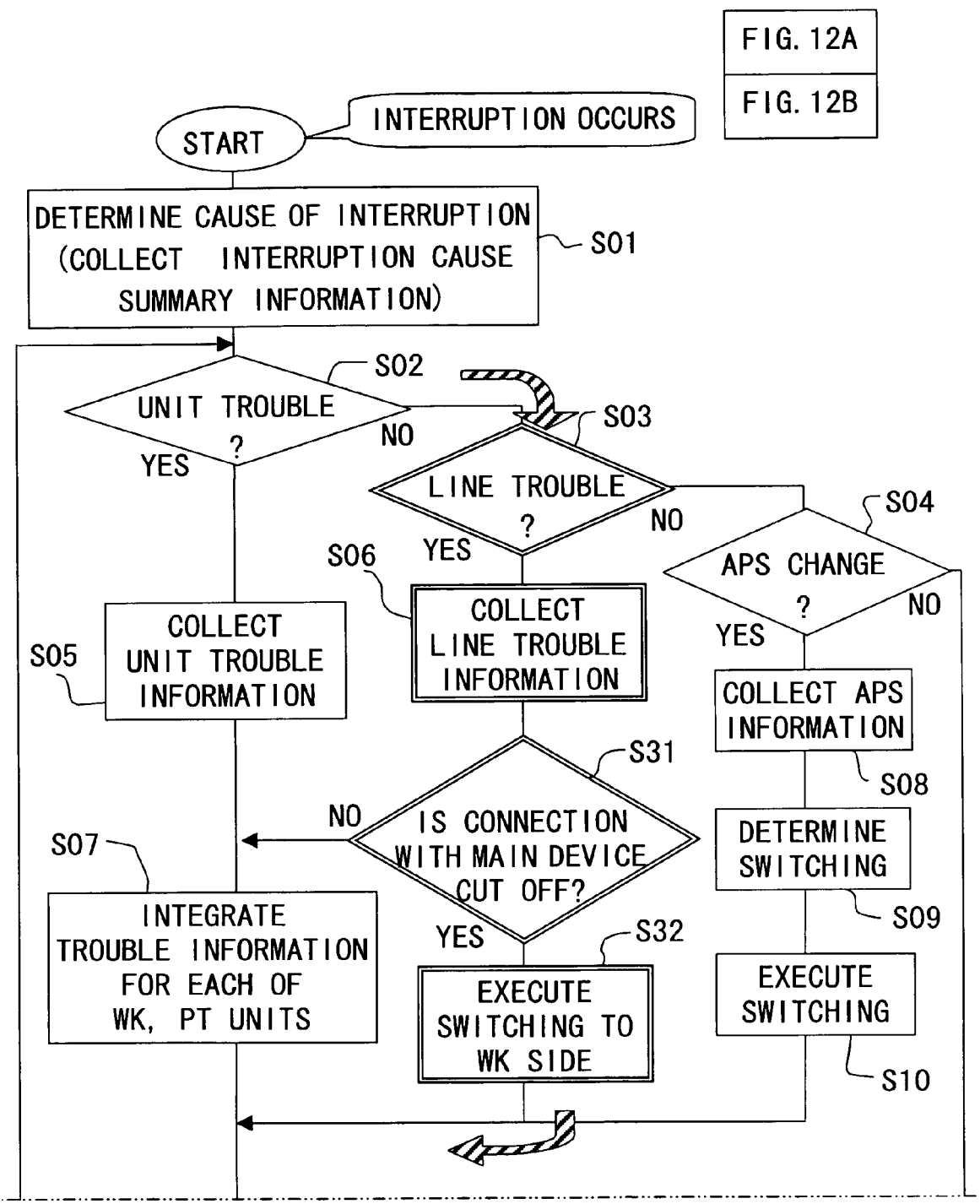
FIG. 12 (FIGS. 12A and 12B) is a flowchart showing an operation flow of the switching managing section of the expansion device when communication with the main device is cut off.
Figure 12B:
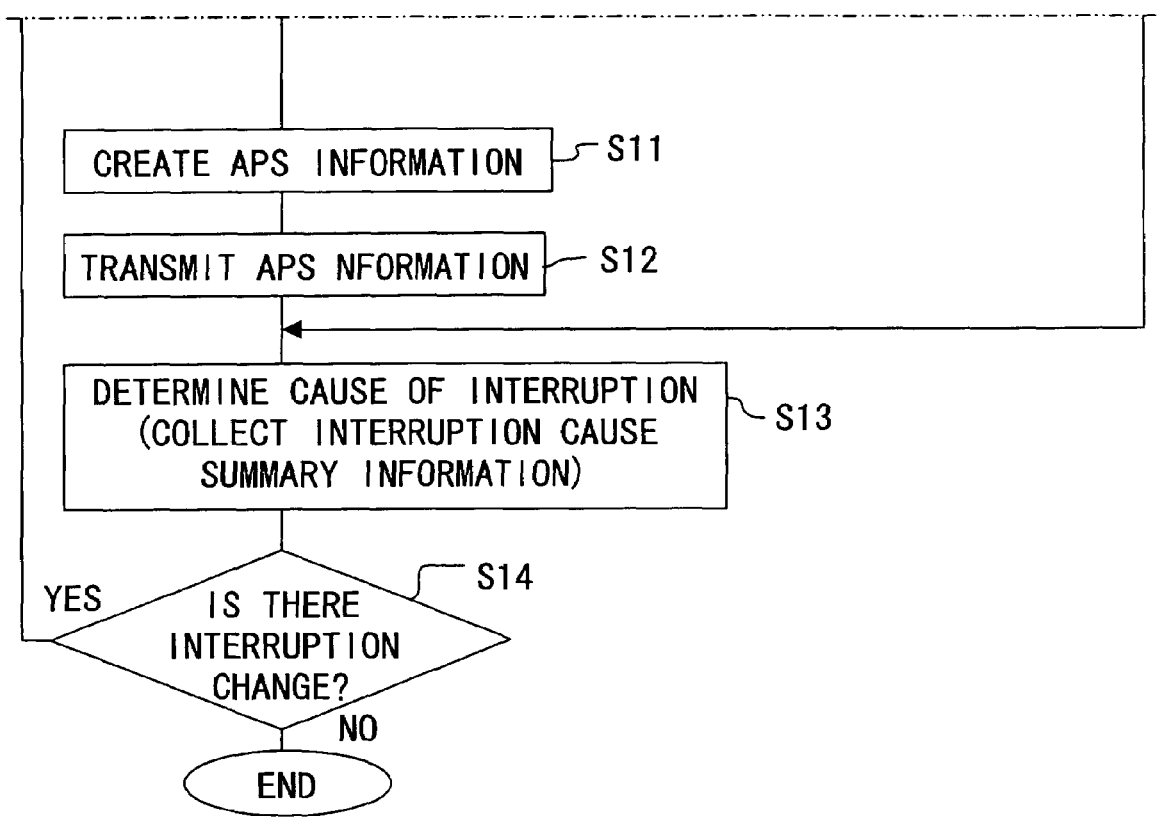

Now, referring to FIG. 12, description will be made of a unit switching operation of the expansion device when communication with the main device is cut off. FIG. 12 is a flowchart of an operation of the switching managing section 27b of the expansion device when the communication with the main device is cut off, expanding processing after S06 more in detail in the operation flow of the switching managing section 27b at a normal time shown in FIG. 10. Accordingly, the processing after S06, i.e., S31, S32, will be described. Other processing is similar to that of the normal time.

When an interruption occurs, and a cause of the interruption concerns a line trouble, the switching trigger collecting section 172 collects line trouble information (S06, similar to that of the normal time).

Subsequently, from the collected line trouble information, determination is made as to an abnormality in a line for transmitting/receiving APS information with the main device, and disconnection (S31). If the line is not cut off, processing after S07 is executed as similar as in the case of normal processing. However, if the line has been cut off, a processing is executed to forcibly switch an active unit of the own optical transmission device (expansion device) to the working side (S32). Then, APS information indicating a unit state after switching is created, and processing similar to that of the normal time is executed thereafter (S11 and the subsequent steps). On the main device side, determination is made in S04 upon reception of the APS information, and processing similar to the normal processing is executed thereafter. As a result, unit switching to the working side occurs in the main device.

If a trouble occurs in the line for transmitting/receiving the APS information, i.e., if the communication of the expansion device with the main device is cut off, the system is put in a situation in which unit switching cannot be synchronized, leading to a problem such as signal cutting-off at the end. Thus, under such a situation, a constitution is employed in which the expansion device always switches the unit to the working side.

Thus, even when the expansion device cannot receive the switching notification from the main device, unified unit switching is enabled in the entire shelf, and redundancy can be realized for the system.

<<Case of Removal of Expansion Device from Main Device>>

A situation is conceivable in which the line between the main device and the expansion device is set in a signal cut-off state for both of the working and protection sides. In other words, a situation may occur in which the main device 110 cannot receive a transmission signal from a certain expansion device at all. In such a case, a constitution is employed in which the main device 110 of this embodiment excludes the expansion device of the signal cut-off state from switching determination of the entire system.

Figure 13:
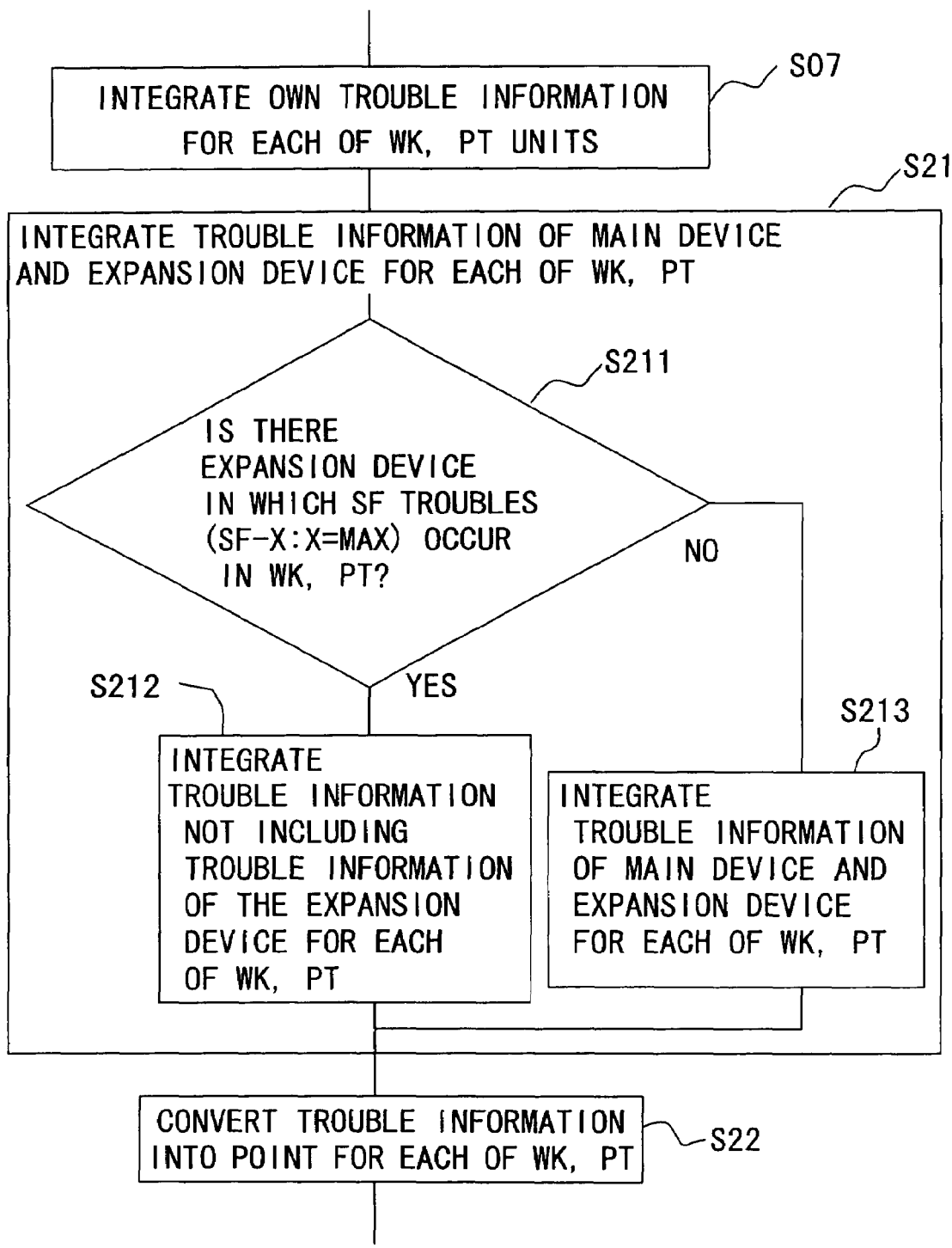
FIG. 13 is a diagram showing a processing flow of the switching managing section of the main device when the expansion deice is not subjected to switching determination.
Figure 14:
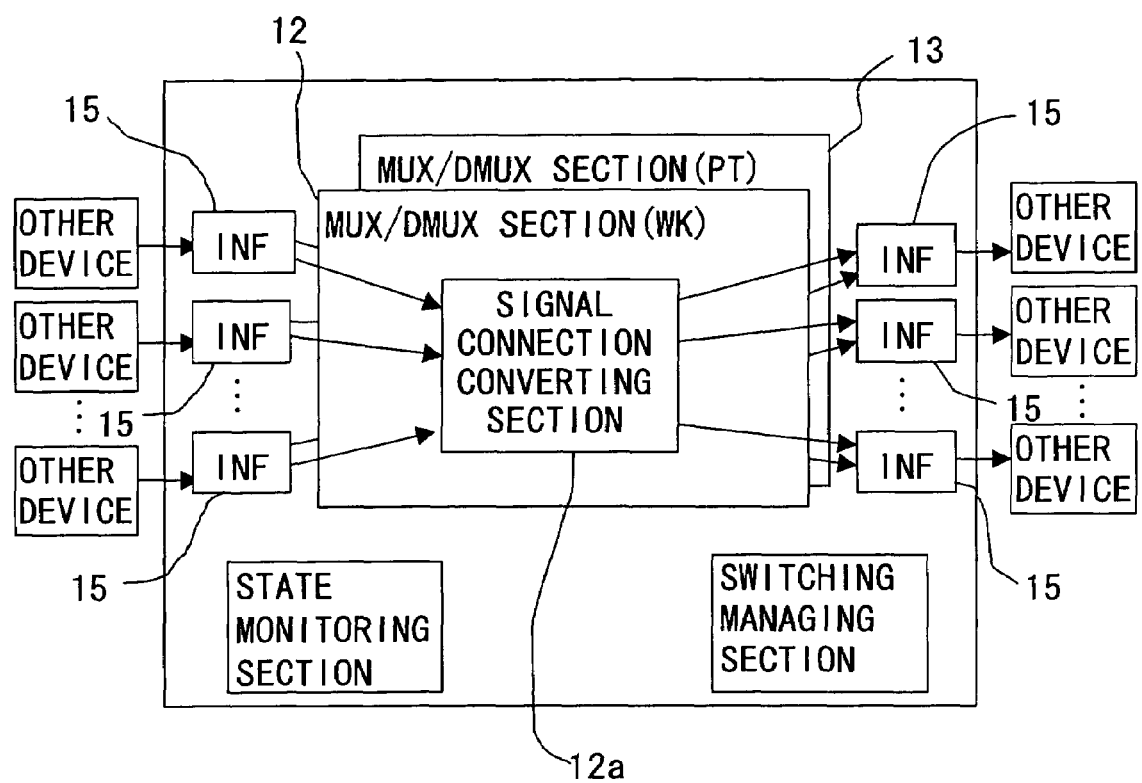
FIG. 14 is a diagram showing a functional constitution in a conventional device configuration; and, FIG. 15 is a diagram showing a functional constitution in a configuration of a plurality of optical transmission devices.
Figure 15:
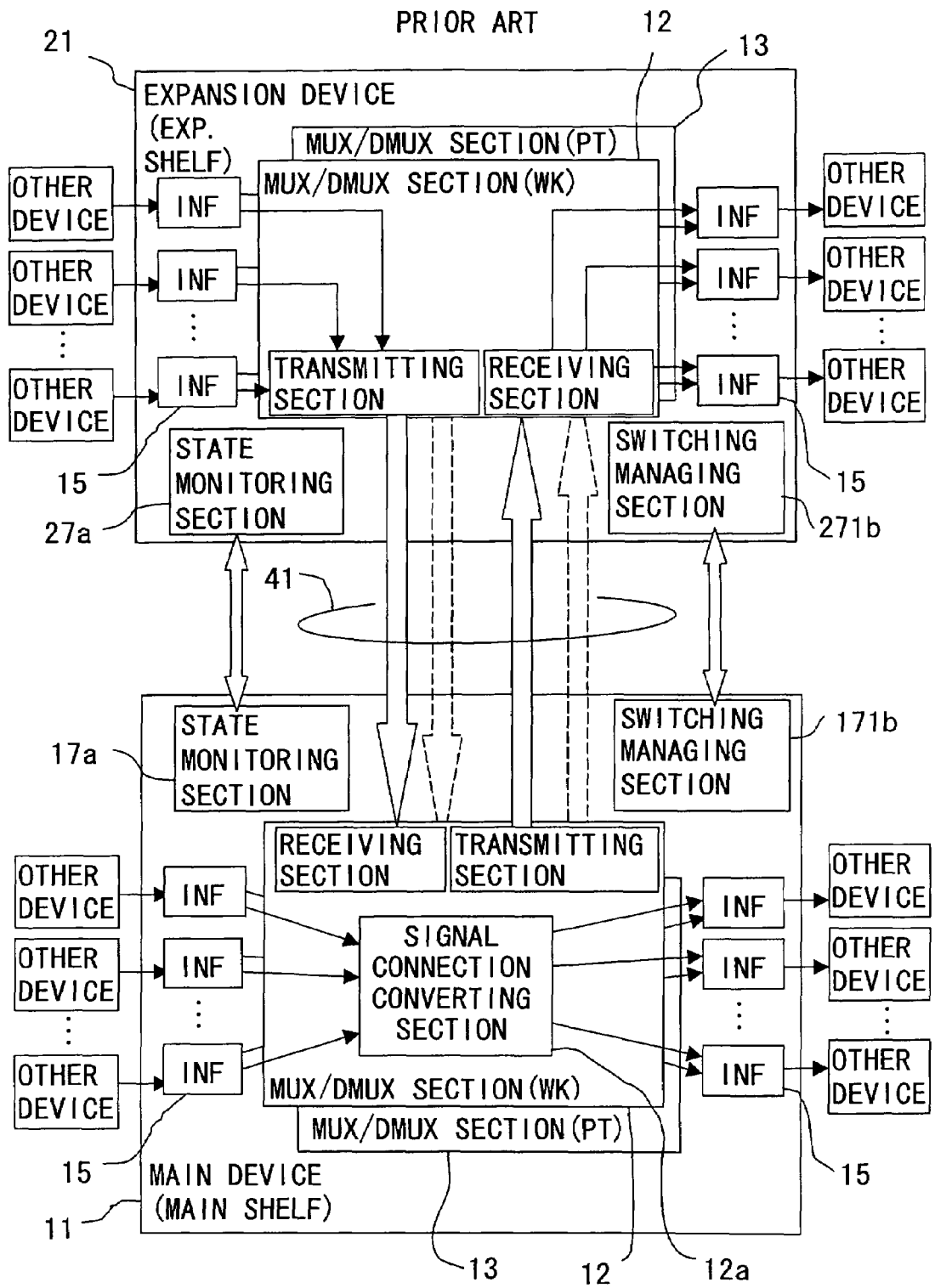

Now, referring to FIG. 13, in the above case, unit switching determination of the main device 110 will be described. FIG. 13 is a flowchart of an operation of the switching managing section 17b of the main device when the expansion device is excluded from unit switching determination, expanding processing of S12 more in detail in the operation flow of the switching managing section 17b at the normal time shown in FIG. 11. Thus, S21 alone will be described. Other processing is similar to that of the normal time.

Upon reception of the unit and line trouble information integrated for each unit of the working and protection sides (S07) by the switching trigger collecting unit 172, the switching managing section 17b integrates trouble information of the main device and the expansion device for each of the working and protection (S21). In this event, based on the trouble information collected as the line troubles of the own optical transmission device (main device), i.e., information that the own optical transmission device as a receiving side determines a line trouble between the expansion devices (e.g., 14a shown in FIG. 3), determination is made as to whether or not there is a expansion device in which SF troubles (SF-x: x=maximum number of lines) occur on both of working and protection sides (S211). In the case that it determines no device, the expansion device is counted out from switching determination, and trouble information not including that of the expansion device are integrated for each of the working and protection sides (S212). As a result of the determination, such a expansion device is not included, all information are integrated for each of the working and protection as in the normal case (S213). Then, trouble point conversion is executed based on the integrated information (S22), and processing similar to the normal processing is executed thereafter.

A constitution is employed in which when signal cut-off states are set on both of the working and protection sides for the main device in the line with the expansion device, the main device of this embodiment counts out the expansion device of the signal cut-off state from switching determination of the entire system.

Thus, by executing unit switching determination with priority given to a relation with a normal expansion device, unit switching of higher redundancy is realized.

MODIFIED EXAMPLE

According to the embodiment of the present invention, the number of expansion devices is two. However, even when the number is three or more, the above switching determination based on the trouble points can be directly used, and for example, a state can be decided by large and small comparison.

In addition, since the number of expansion devices as a target of trouble collection only increases, the current processing can be used for addition of trouble points, and the added number only increases, and functional expansion can be facilitated.

Furthermore, there is a case in which the expansion device and the main device are interconnected through more optical fibers. Such the case can be dealt with by slightly changing the way to use K1/K2 bytes shown in FIG. 7. In this case, in the information notified by the expansion device (FIG. 7B), an area of "SWITCHED STATE" of the K1 byte is set for the number of trouble lines, and an area of "TROUBLE INFORMATION" is set for a trouble type only (SD/SF), whereby 256 kinds can be dealt with at maximum. The K2 byte can be similarly dealt with by setting an area of "RESERVED" for the number of trouble lines. In this case, a switched state of the expansion device cannot be determined by the main device. However, since there is rule established that the expansion device side always complies with a switching notification state from the main device, and the expansion device cannot receive the switching notification from the main device side unless it complies, the switched state of the expansion device can be guessed by the main device even without the switched state notification from the expansion device. As a result, no problems occur even without the switched state notification from the expansion device.

What is claimed is:

1. An optical transmission system including a plurality of optical transmission devices, comprising:
a main device; and
a plurality of expansion devices,
the plurality of optical transmission devices are configured by the main device and the plurality of expansion devices, wherein
the main device and the plurality of expansion devices includes a plurality of interface units controlling signal transmission/reception, and each multiplexing/demultiplexing section of each of working and protection sides multiplexing/demultiplexing a signal transmitted/received by each interface unit,
the multiplexing/demultiplexing section of the working side of each expansion device is connected through a plurality of optical lines to the multiplexing/demultiplexing section of the working side of the main device,
the multiplexing/demultiplexing section of the protection side of each expansion device is connected through a plurality of optical lines to the multiplexing/demultiplexing section of the protection side of the main device,
the multiplexing/demultiplexing section of each of the working and protection sides of the main device includes a switching section switching an output destination of a signal input to each of the main device and the plurality of expansion devices according to an address of the signal,
each of the plurality of expansion devices includes:
a expansion device side trouble information collecting section collecting trouble information, indicating a trouble state of one or more optical lines among the plurality of optical lines for receiving a signal from the main device, for each of the working and protection sides;
a transmitting section transmitting the collected trouble information of the working and protection sides to the main device; and
a expansion device side working/protection switching control section controlling switching between the working and protection sides according to a switching instruction between the working and protection sides received from the main device, and
the main device includes:
a main device side trouble information collecting section collecting trouble information indicating a trouble state of, among the plurality of optical lines for connecting between the main device and the expansion devices, one or more optical lines for receiving a signal from each of the expansion devices for each of the working and protection sides and each expansion device;
a receiving section receiving the trouble information of the working and protection sides collected by the expansion device side trouble information collecting section from the expansion device;
an integrating section creating integrated trouble information integrating the trouble information collected by the main device side trouble information collecting section and the trouble information collected by the expansion device side trouble information collecting section for each of the working and protection sides and each expansion device;
a storing section storing point information corresponding to the integrated trouble information;
a converting section converting the integrated trouble information into the point information stored in the storing section;
a totaling section totaling the converted point information regarding each of the working and protection sides;
a deciding section deciding which of the working and protection sides is selected by comparing the totaled point information with each other; and
a main device side working/protection switching control section controlling switching between the working and protection sides for the main device according to a deciding result of the deciding section, and notifying each expansion device of a switching instruction similar to that for the main device.

2. An optical transmission system according to claim 1, wherein the point information includes a numerical value allocated according to a degree of a trouble indicated by the integrated trouble information so that the deciding section selects side of a good degree of a trouble between the working and protection sides.

3. An optical transmission system according to claim 1, wherein the main device side working/protection switching control section notifies each expansion device of the switching instruction by using an overhead portion of an optical communication frame transmitted through at least one of the plurality of optical lines for connecting the multiplexing/demultiplexing section of the protection side of the main device and the multiplexing/demultiplexing section of the protection side of each expansion device.

4. An optical transmission system according to claim 1, wherein the expansion device side working/protection switching control section controls switching of the expansion device itself to the working side when the switching instruction cannot be received from the main device due to a trouble of the optical lines.

5. An optical transmission system according to claim 1, wherein the integrating section, if all the degrees of troubles of the plurality of optical lines for both the working and protection sides in one of the plurality of expansion devices are not good, excludes the trouble information of the expansion device from an integration target.

* * * * *